(12) United States Patent
Semel et al.

(10) Patent No.: US 12,375,519 B2
(45) Date of Patent: Jul. 29, 2025

(54) ENHANCED RISK ASSESSMENT

(71) Applicant: FORESCOUT TECHNOLOGIES, INC., San Jose, CA (US)

(72) Inventors: Keren Mina Semel, Tel Aviv (IL); Naor Kalbo, Givatayim (IL)

(73) Assignee: Forescout Technologies, Inc., San Jose, CA (US)

( * ) Notice: Subject to any disclaimer, the term of this patent is extended or adjusted under 35 U.S.C. 154(b) by 129 days.

(21) Appl. No.: 17/039,009

(22) Filed: Sep. 30, 2020

(65) Prior Publication Data

US 2022/0103592 A1  Mar. 31, 2022

(51) Int. Cl.
  *H04L 9/00* (2022.01)
  *H04L 9/40* (2022.01)
(52) U.S. Cl.
  CPC ...... *H04L 63/1433* (2013.01); *H04L 63/1416* (2013.01); *H04L 63/1425* (2013.01); *H04L 63/20* (2013.01)
(58) Field of Classification Search
  None
  See application file for complete search history.

(56) References Cited

U.S. PATENT DOCUMENTS

| 8,621,618 B1* | 12/2013 | Ramsey | G06F 21/316 |
| | | | 713/153 |
| 2013/0096980 A1* | 4/2013 | Basavapatna | G06Q 10/00 |
| | | | 705/7.28 |
| 2014/0380480 A1* | 12/2014 | Tang | H04L 63/1408 |
| | | | 726/24 |
| 2016/0330199 A1* | 11/2016 | Weiner | H04L 63/0853 |
| 2017/0220801 A1 | 8/2017 | Stockdale et al. | |
| 2020/0137102 A1 | 4/2020 | Sheridan et al. | |
| 2020/0195679 A1* | 6/2020 | Du | H04L 63/1433 |
| 2022/0038486 A1* | 2/2022 | Baragaba | H04L 63/083 |

OTHER PUBLICATIONS

International Search Report and Written Opinion of the Patentability of Application No. PCT/US2021/049834 Mailed Jan. 4, 2022, 15 pages.
"Series X: Data Networks, Open Systems Communications and Security," Cybersecurity Information Exchange—Vulnerability/State Exchange, Common Vulnerability Scoring System; X.1521 (Mar. 2016), ITU-T Standard, International Telecommunication, Geneva, Mar. 23, 2016, 15 pages.

* cited by examiner

*Primary Examiner* — Christopher J Brown
(74) *Attorney, Agent, or Firm* — Womble Bond Dickinson (US) LLP

(57) ABSTRACT

Systems, methods, and related technologies for determining a risk score or value are described. The risk score determination may include accessing network traffic from a network, where the network traffic is associated with a plurality of entities. One or more values associated with one or more properties associated with an entity are determined. The one or more values may be based on the network traffic. At least one of a functional risk value, a configurational risk value, or a behavioral risk value associated with the entity are determined. A risk value for the entity is determined based on the functional risk value and at least one of the configurational risk value or the behavioral risk value associated with the entity.

17 Claims, 11 Drawing Sheets

ENHANCED RISK ASSESSMENT

TECHNICAL FIELD

Aspects and implementations of the present disclosure relate to network monitoring, and more specifically, determining risk associated with systems and resources communicatively coupled to a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
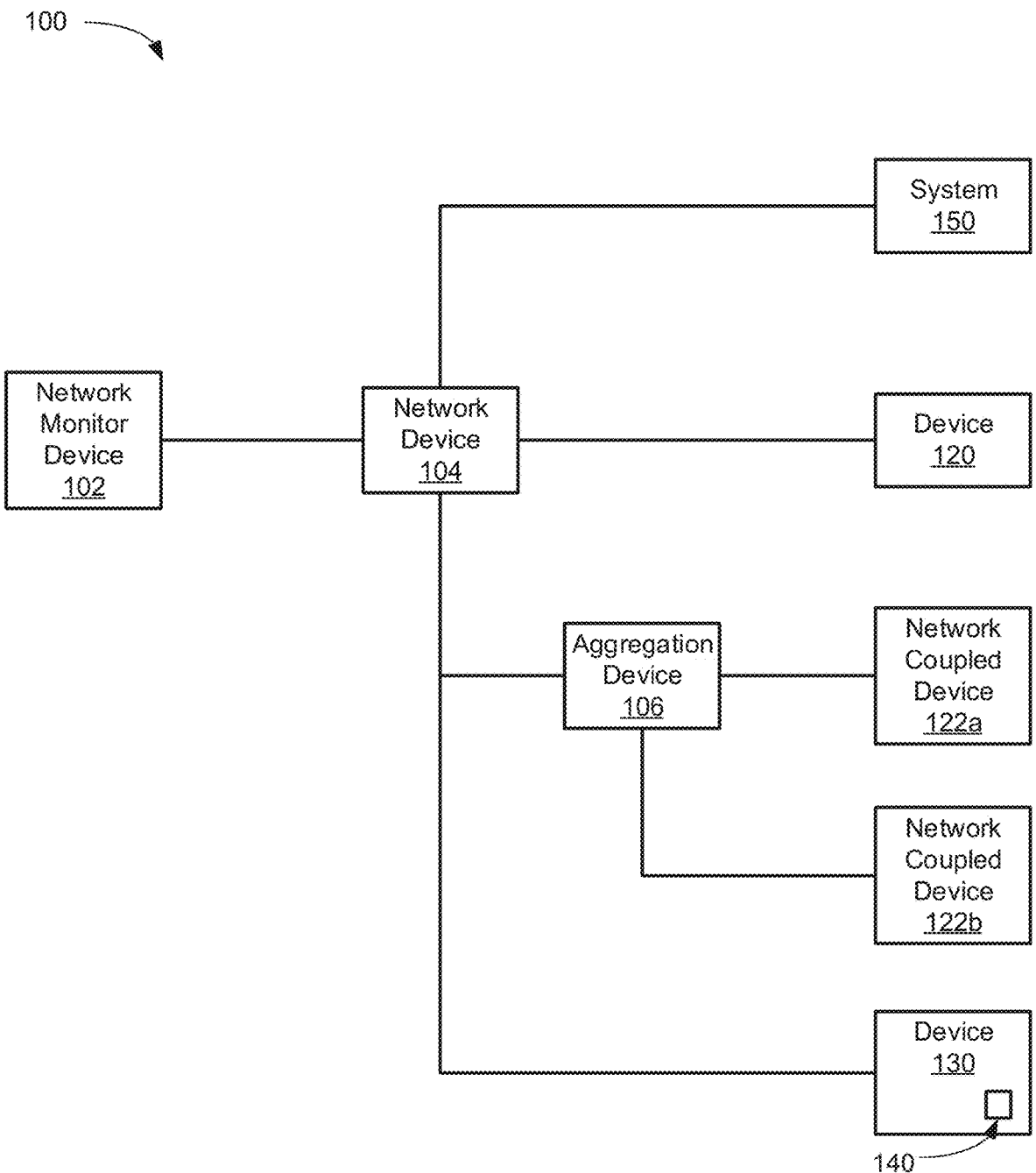
FIG. 1 depicts an illustrative communication network in accordance with one implementation of the present disclosure.

Aspects and implementations of the present disclosure are directed to enhanced risk assessment that includes impact and likelihood aspects. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) in both IT and OT (Operational Technology) environments can make it difficult to effectively ensure that network security is maintained. Accordingly, described herein in various implementations are systems, methods, techniques, and related technologies, which allow for determining a risk (e.g., score or value) for an entity based on a plurality of factors thereby allowing prioritization of risks.

Organizations today have many more connected devices than in the past which significantly elevates their risk. Many of the devices are unmanaged meaning that control and monitoring are likely more difficult. Many of those devices are IoT devices, which are more vulnerable and more difficult to manage and protect. In particular, IoT devices are often more vulnerable than corporate managed IT devices. As a result, network and organizations are exposed to an increasing number of security threats.

The traditional risk assessment and vulnerability analysis (VA) tools (including agent based systems) focus on managed IT assets and perform poorly, if at all, with respect to IoT devices and other unmanaged devices. In addition, security teams are often overwhelmed with the volume of work and alerts from security systems. Security teams may also be short staffed and thereby be without the capabilities (e.g., knowledge and resources) to detect and mitigate risks and attacks. Organizations needs a solution to identify and prioritize devices with higher risk across all types of devices including IoT devices.

Embodiments are able provide visibility into the risk imposed by different entities of one or more networks and to enable prioritization of the different risks based on their real threats to the enterprise. The risk of an entity may be a measure of the extent to which the entity (e.g., device or asset) is threatened by a potential circumstance or event, and may be a function of: (a) the adverse impact that would arise if the circumstance or event occurs; and (b) the likelihood or probability of the occurrence. Embodiments provide a quantitative measurement of this risk. The adverse impact may be assessed based on the consequences of the circumstance or event. The likelihood is based on assessing the possibility of how likely the event is to happen. The threat of the event is based on a threat actor which may be internal or external to an organization. The circumstances may include an entity not being properly configured (e.g., an open port) or the event may include an entity accessing or communicating with a malicious IP address.

Embodiments can differentiate between a device or entity that is at risk (e.g., at risk of becoming compromised) and an entity that is risky (e.g., creates a risk to a network or one or more entities). For example, a Smart-TV with a Telnet port open by default induces a risk to the Smart-TV. An entity at risk may be based on one or more factors including open shares (e.g., files shares, data bases, other data storage structures, etc.), default credentials, open ports, weak SSL/TLS, etc. In contrast, a Smart-TV scanning the network during reconnaissance or a lateral movement phase is a risky device. A risky entity may be determined based on malicious activity detected in association with the entity (e.g., scanning a network, communicating with a malicious IP address, etc.).

An entity at risk may induce a risk to the entire organization when compromised. The entity at risk may be an entity that has a vulnerability and it is at risk of being compromised. For example, an entity with a vulnerability or default credentials may be at risk of being compromised or being controlled. An entity at risk may have one or more potential risk factors which are associated with potential risks, e.g., a known vulnerability, Internet exposure, weak security traffic posture, end of life (EoL) proximity, etc.

A risky device or entity, likely has been compromised, induces a risk to a network or organization. For example, an entity can be determined to be a risky entity based on communicating with a malicious IP address. There may be a high level of confidence that the risky entity is compromised due to communicating with the malicious IP address. Risk factors of embodiments take into account both scenarios (e.g., an entity is at risk and a risky entity within the organization, network, etc.). A risky entity may be a device that was at risk due to a known vulnerability, open ports, credentials, etc., that have been exploited. For example, a state machine may be associated with each entity and reflects or tracks states of whether the entity is safe, the entity is at risk, or the entity is risky. In the state machine, an entity that is at risk moves to a risky entity state upon there being a sufficient level of suspicion that the entity has been compromised or has or is being exploited. For example, the state machine associated with an entity may change from a state of entity at risk to a risky entity based on observation of malicious activity or evidence that an entity has been exploited or leveraged (e.g., scanning a network, communicating with a malicious IP, communicating in an manner different from previous communications, sending a large volume of packets to other entities on the network, etc.). Embodiments are able to determine a risk score for an entity to reflect that the entity is safe, at risk, or risky based on one or more factors described herein.

Embodiments are able to determine a risk value the combines the actual factors and potential factors to give an improved risk score. Embodiments thus are able to determine a risk value for an entity that incorporate aspects of an entity being at risk and an entity being risky (e.g., to an organization, network, etc.).

Embodiments can assess a set of functional, configurational, and behavioral related or associated factors, which separately may have inadequate or insufficient meaning, which when used in conjunction give a comprehensive picture of the risks an entity or device is facing.

In some embodiments, an entity risk score is based on several different indicators or factors to provide more useful and actionable risk scores. To detect the different risk indicators, embodiments may use three entity characteristics:

(1) Functional Factors refers to observations regarding 'What the device or entity is'—This can include knowledge defining the entity's functionality (e.g., function the entity performs within the organization), purpose (e.g., the organizational role the entity serves), criticality (e.g., the importance of the entity within the network, to the organization, etc.), acquaintance or familiarity (e.g., the familiarity of the entity to the organizational network, for instance, continuous familiarity, operating on a network for an extended period of time, etc.).

(2) Configurational Factors refers to observations regarding 'What the device or entity has'—entity status (e.g., vulnerabilities, configuration, installed applications, etc.). This can include knowledge or information defining the entity's status and a change in this status is usually possible (and can be observed). This can further include known vulnerabilities, public exploits, third party knowledge, open ports, default credentials (e.g., default usernames, default passwords, weak username and password combinations, etc.), open shares (e.g., file shares), and end of life (EoL) information (e.g., proximity in time to EoL, or being past EoL).

(3) Behavioral Factors refers to observations regarding 'What the entity does'—entity activity (e.g., network related activities). This can include traffic reputation based on behavioral actions (e.g., communication with an IP address, a DNS lookup, a request to a URL, any of which may be known or suspected of being malicious), Internet Exposure (e.g., public Internet facing), and protocol based information (e.g., TLS/SSL configurational analysis, vertical specifics, for instance, a vulnerability in a protocol used primarily in a particular vertical or industry, possibly a proprietary IoT protocol, etc.), malicious activity, anomaly detection, secure traffic posture (e.g., encrypted traffic distribution based on the use of protocols that are considered secure or of sufficient security level).

The risk assessment of embodiments may thus be based on a combination of functional, configurational, and behavioral factors. Embodiments may further incorporate aspects of whether each factor is actual or potential (e.g., for each of the functional, configurational, and behavioral factors) in the determination of risk. Actual factors can include malicious activities observations or factors that can be immediately exploited or leveraged. For example, communications of an entity with a malicious IP address may be considered an actual behavior factor. The potential factors can include factors requiring some significant additional operations or conditions in order to threaten an entity. For example, an entity with an associated known vulnerability may be considered a potential configurational factor, if a port of the entity associated with the known vulnerability may be closed.

Embodiments may provide automatic and continuous calculated risk score per entity in a network based on multiple risk indicators or factors which can be effectively displayed in monitoring dashboards. Embodiments may be used be in a variety of environments including, but not limited to, campus, data center, cloud, medical, and operational technology or industrial environments.

Embodiments may incorporate information from one or more other systems (e.g., system 150). For example, embodiments may combine data from third party threat feeds thereby enabling up to date risk scores based on the latest vulnerabilities. This can include combining information from (a user's) existing vulnerability analyses tools, combining risk for Internet of Medical Things (IoMT) entities, and combining risk for OT entities. Embodiments may also integrate third party threat feeds for blacklisted IPs (e.g., for IP reputation) and feeds for vulnerabilities (e.g., CVEs) and exploits.

The risk scoring of embodiments may be well suited for enterprise IoT entities and also covers IT entities as well. Embodiments may enable better prioritizing of risks based on real threats to an enterprise or organization thereby enabling reducing risk (e.g., more rapidly) to the business. In some embodiments, the risk calculation may be cloud based. Embodiments may further work in conjunction with network visibility and control capability products. For example, visibility functionality may be used to collect risk indicators (e.g., associated with various factors, communications, traffic flow, vulnerabilities, etc.).

Embodiments may include a multi-layer calculation architecture with risk calculation based on multiple different risk indicators or factors (e.g., functional, behavioral, and configurational) to better predict the risk an entity imposes given its nature, behavior, vulnerabilities, undesirable communication, lack of available patches, importance to the organization, etc. Embodiments may base a risk score on detecting suspicious anomalies in IoT devices' behavior using machine learning (ML) techniques. For example, this may be based on detection of a device deviating from a learned baseline of their target destination service (e.g., via service enumeration), from a learned baseline of their target destination (e.g. lateral movement or command and control (C2) communication, for instance, with a bot net), or from a learned baseline of their normal traffic throughput (e.g., an infected device in exfiltration phase may involve significantly increased traffic throughput).

Advantageously, embodiments are configured for determining a more sophisticated risk score that incorporates risk based on multiple factors (e.g., functional, configurational, and behavioral). Embodiments thereby provide an enhanced risk assessment which enables better use of compliance and security resources within an organization. Resources are thus made available by embodiments to focus on responding to security threats based on risk level and allow reducing risk in an efficient and effective manner.

Accordingly, described herein in various implementations are systems, methods, techniques, and related technologies, which may perform comprehensive risk analysis. As described herein, the combinations of various risk factors, among others, can be used for comprehensive risk determination thereby allowing effective response prioritization.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

An entity or entities, as discussed herein, includes devices (e.g., computer systems, for instance laptops, desktops, servers, mobile devices, IoT devices, OT devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices or entities including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining a risk score for each entity communicatively coupled to a network, as described herein. The risk score or value may incorporate risk based one or more factors (e.g., functional, configurational, behavioral, or a combination thereof), as described herein.

Network monitor device 102 may provide an interface (e.g., a graphical user interface (GUI)) for viewing, monitoring, modifying, and configuring risk determination (e.g., user configuration of one or more parameters or factors used for determining a risk score). In some embodiments, network monitor device 102 is operable to perform visualization (e.g., including tables or matrixes) of risk values for each entity and groups of entities (e.g., a segment, a location, etc.).

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), proprietary protocols, etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in realtime which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
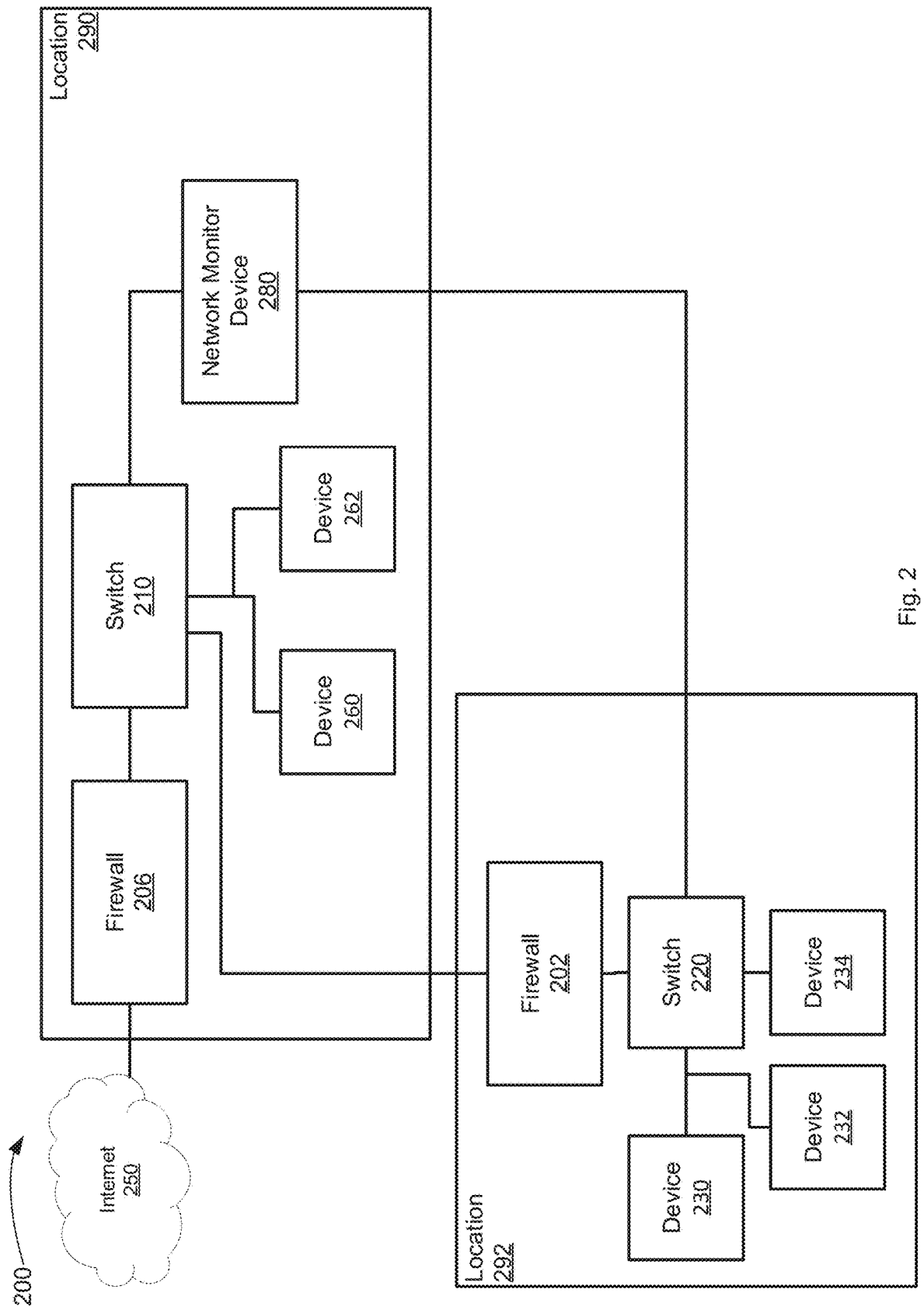
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210-220) and a network monitor device 280 (e.g., network monitor device 102) which may handle gathering information about the various devices communicatively coupled to example network 200. Network monitor device 280 can perform comprehensive risk analysis of entities (e.g., devices 230-234 and 260-262), as described herein. The information gathered by network monitor device 280 can be used for prioritizing risks for mitigation, monitoring risk, etc.

FIG. 2 shows example devices 230-262 (e.g., devices 106, 122a-b, 120, and 130, other physical or virtual devices, other entities, etc.) and it is appreciated that more or fewer network devices or other entities may be used in place of the devices of FIG. 2. Example devices 230-262 may be any of a variety of devices or entities (e.g., OT devices, IoT devices, IT devices, etc.), as described herein. For example, the enforcement points including firewalls 202-206 and switches 210-220 may be any entity (e.g., network device 104, cloud infrastructure, etc.) that is operable to allow traffic to pass, drop packets, restrict traffic, etc. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar to network monitor device 102. Embodiments support IPv4, IPv6, and other addressing schemes. In some embodiments, network monitor device 280 may be communicatively coupled with firewalls 202-206 and switches 210-220 through additional individual connections (e.g., to receive or monitor network traffic through firewalls 202-206 and switches 210-220).

Switches 210-220 communicatively couple the various devices of network 200 including firewalls 202-206, network monitor device 280, and devices 230-262. Firewalls 202-206 may perform network address translation (NAT) and firewall 202 may communicatively couple the devices 230-234, which are behind the firewall 202, with network monitor device 280, switch 210, and firewall 206. Firewall 206 communicatively couples network 200 to Internet 250 and firewall 206 may restrict or allow access to Internet 250 based on particular rules or ACLs configured on firewall 206. Firewalls 202-206 and switches 210-220 are enforcement points, as described herein.

Network monitor device 280 is configured to identify, classify, determine one or more characteristics of entities (e.g., devices 230-262), determine a risk value or score for each entity, or a combination thereof on network 200, as described herein. Network monitor device 280 can access network traffic from network 200 (e.g., via port mirroring or switched port analyzer (SPAN) ports of firewalls 202-206 and switches 210-220). Network monitor device 280 can perform passive scanning of network traffic by observing and accessing portions of packets from the network traffic of network 200. Network monitor device 280 may perform an active scan of a device of network 200 by sending a request to any entity of network 200. The information from passive and active scans of entities of network 200 can be used to determine a risk for each entity of network 200, as described herein.

As shown, network 200 is spread over locations 290-292. Locations 290-292 may be separate geographical locations, separate plants, different parts of a single plant, different segments, subnetworks, etc. Embodiments may support determining a risk value for a group of entities (e.g., based on each of the entities in a department, division, floor, building, segment, type of entity, for instance, IoT devices, sensitive devices, etc.).

For example, device 260 may be a voice over IP IoT device (e.g., a VOIP telephone). Device 260 is used for organizational communication and multiple instances of device 260 may be widely deployed within an organization. Device 260 may have a medium asset criticality level to the organization based on being used for organizational communication and multiple instances of device 260 may be widely deployed within the organization. Device 260 has six known vulnerabilities (e.g., CVEs). Each known vulnerability has an assigned common vulnerability scoring system (CVSS) score. The vulnerabilities may have CVSS scores with associated severities of two low severity, one medium severity and three high severity. Device 260 has a total number of three open ports. Two of the open ports are categorized as Gain-Access ports (e.g., moderate impact): HTTP and SIP, while the other port is a Telnet port which is categorized as Gain-Control port (e.g., high impact). Device 260 has been observed attempting to reach two malicious external IPs in the last 24 hours impacting its traffic reputation. In addition, device 260 is frequently a target of connection initiation attempts from the (public) Internet suggesting Internet exposure.

As another example, device 234 a smart Projector. Device 234 is located within one of an organization's meeting rooms. Device 234 has a low asset criticality level within the organization based on being used in a single meeting room within the organization. Device 234 has one medium severity known vulnerability (e.g., CVE). In addition, device 234 has a total number of four open ports, each of them categorized as Gain-Access ports (moderate impact): real time streaming protocol (RTSP) (e.g., TCP/UDP 554), Universal Plug and Play (UPnP) (e.g., UDP port 1900), Web Services Dynamic Discovery (WSDD) (e.g., TCP/UDP 3702) and HTTPS (e.g., TCP 443). Device 234 is accessible from the (public) Internet impacting the Internet exposure factor.

The risk factors, risk factor weights, and factor scores for the above examples are depicted in Table I below. Table I shows values for each factor that can be used in determining a respective risk score for device 260 and device 234, in accordance with various embodiments.

TABLE I

| Category | Factor Type | Factor Type Weight | Factor Name | Device 260 (VoIP Phone) Factor Score | Device 234 (Smart Projector) Factor Score |
|---|---|---|---|---|---|
| Functional Factors | Potential | 1 | Asset Criticality (AC) | 0.9 | 0.8 |
| Configurational Factors | Potential | 0.6 | Known Vulnerabilities (KV) | 7.3 | 4.1 |
|  | Actual | 0.4 | Open Ports (OP) | 7.4 | 5.5 |
|  | Actual | 0.8 | Traffic Reputation (TR) | 2.0 | 0 |
| Behavioral Factors | Potential | 0.2 | Internet exposure (IE) | 10 | 10 |
|  |  |  | Device Risk Score | 9.8 | 5.3 |
|  |  |  | Device Risk Severity | Critical | Medium |

Using the weights for each factor and the factor score, the risk score or value for an entity can then be computed using the equation:

$$Risk = \min\left(\sum_{\substack{fnc-fct \in \\ Functional \\ Factors}} (W_{fnc-fct} \times f_{fnc-fct}) \times \left[\sum_{\substack{cnfg-fct \in \\ Configurational \\ Factors}} (W_{cnfg-fct} \times f_{cnfg-fct}) + \sum_{\substack{bvrl-fct \in \\ Behavorial \\ Factoes}} (W_{bvrl-fct} \times f_{bvrl-fct})\right], 10\right)$$

Where $\sum_{\substack{fnc-fct \in \\ Functional \\ Factors}} (W_{fnc-fct} \times f_{fnc-fct})$ is a total or sum of each of the functional factor weights ($W_{f_{nc-fct}}$) multiplied by each functional value ($f_{f_{nc-fct}}$). Where $$\sum_{\substack{cnfg-fct \in \\ Configurational \\ Factors}} (W_{cnfg-fct} \times f_{cnfg-fct})$$

is a total or sum of each of the configurational factor weights ($W_{cnfg-fct}$) multiplied by each functional value ($f_{cnfg-fct}$). Where $$\sum_{\substack{bvrl-fct \in \\ Behavorial \\ Factors}} (W_{bvrl-fct} \times f_{bvrl-fct})$$

is a total or sum of each of the functional factor weights ($W_{bvrl-fct}$) multiplied by each functional value ($f_{bvrl-fct}$).

In this example, functional factors value is determined using the equation:

$$\text{Functional Factors} = \sum_{\substack{fnc-fct \in \\ Functional \\ Factors}} (W_{fnc-fct} \times f_{fnc-fct}) = (W_{AC} \times f_{AC})$$

Where $W_{AC}$ is the weight associated with asset criticality and $f_{AC}$ is the value associated with asset criticality factor formula result.

The configurational factors are determined using the equation:

$$\text{Configurational Factors} = \sum_{\substack{cnfg-fct \in \\ Configurational \\ Factors}} (W_{cnfg-fct} \times f_{cngfg-fct}) = ((W_{KV} \times f_{KV}) + (W_{OP} \times f_{OP}))$$

Where $W_{KV}$ is the weight associated with known vulnerabilities and $f_{KV}$ is the value associated with known vulnerabilities factor formula result. Where $W_{OP}$ is the weight associated with open port(s) and $f_{OP}$ is the value associated with open port(s) factor formula result.

The behavioral factors are determined using the equation:

$$\text{Behavorial Factors} = \sum_{\substack{bvrl-fct \in \\ Behavorial \\ Factors}} (W_{bvrl-fct} \times f_{bvrl-fct}) = ((W_{TR} \times f_{TR}) + (W_{IE} \times f_{IE}))$$

Where $W_{TR}$ is the weight associated with traffic reputation and $f_{TR}$ is the value associated with traffic reputation factor formula result. Where $W_{IE}$ is the weight associated with Internet exposure and $f_{IE}$ is the value associated with Internet exposure factor formula result.

The resulting equation may be expressed as:

$$\text{Risk}=\min((W_{AC} \times f_{AC}) \times [((W_{KV} \times f_{KV})+(W_{OP} \times f_{OP}))+ ((W_{TR} \times f_{TR})+(W_{IE} \times f_{IE}))],10)$$

Where risk is the minimum of the value of 10 or the functional factors $(W_{AC} \times f_{AC})$ multiplied by the sum of the configurational factors $(W_{KV} \times f_{KV})+(W_{OP} \times f_{OP})$ and behavioral factors $(W_{TR} \times f_{TR})+(W_{IE} \times f_{IE})$.

The risk score of device 260 may thus be determined to be:

$$\text{Risk}_{Device\ 234}=\min((1 \times 0.9) \times [((0.6 \times 7.3)+(0.4 \times 7.4))+ ((0.8 \times 2)+(0.2 \times 10))],10)=9.8$$

The risk score of device 234 may thus be determined to be:

$$\text{Risk}_{Device\ 234}=\min((1 \times 0.8) \times [((0.6 \times 4.1)+(0.4 \times 5.5))+ ((0.8 \times 0)+(0.2 \times 10))],10)=5.3$$

Thus, the risk scores of device 234 and device 260 reflect that device 260 in its current risk posture requires more immediate attention, as it is at higher risk both to itself and to the rest of the organization, network, one or more other entities, etc.

Figure 3:
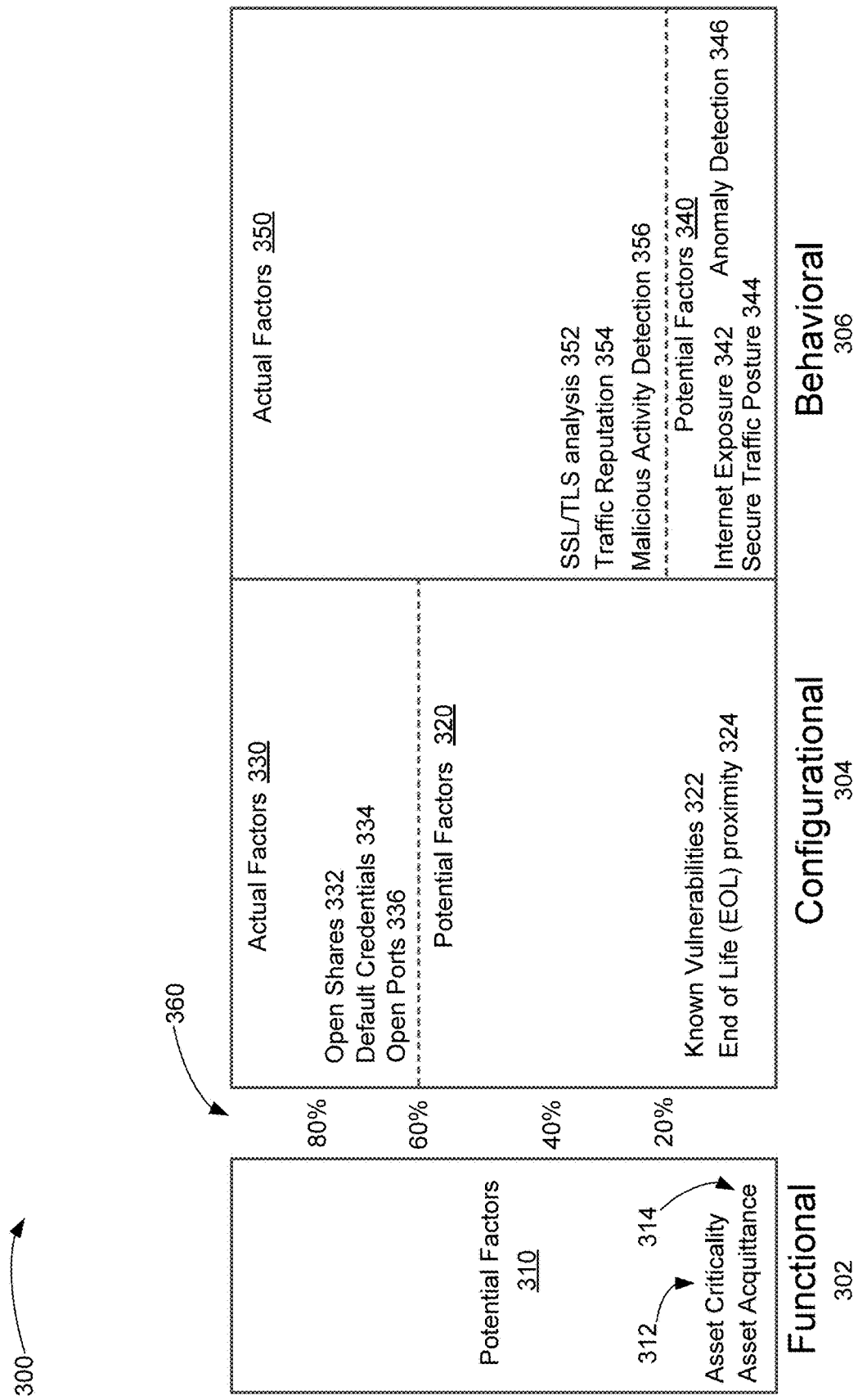
FIG. 3 depicts example categories of factors for determining a risk score in accordance with one implementation of the present disclosure.

FIG. 3 depicts example categories of factors for determining a risk score in accordance with one implementation of the present disclosure. Example diagram 300 depicts various potential and actual factors in relation to functional, configurational, and behavioral categories and their respective weights within each category. Example diagram 300 includes functional category 302, configurational category 304, and behavioral category 306. Each of the categories may have potential factors and actual factors. Example diagram 300 further includes weight scale 360 which depicts the weight that will be applied to one or more values associated with actual factors or potential factors within a category.

The factors and categories described with respect to FIG. 3 may each be determined numerically based on a variety of factors or details described herein. The formulas with respect to each of the factors are described with respect to FIG. 4.

The entity risk score can be determined based on each factor of each category of example diagram 300. This can yield an optimal comprehensive risk score or picture as more factors participate in the calculation, more specifically, based on the conjunction or combination of factors from different categories. In some embodiments, a risk score or value may be determined based on a minimum of asset criticality and one other factor (e.g., configuration factor or behavioral factor). Embodiments may thus yield a risk score or value in cases where asset criticality and factors from only one category participates or is available (e.g., a non-conjunction scenario).

The risk score or value represents the risk estimation of an entity in the network. The score may combine asset criticality, vulnerability, threat information, and other information thereby providing better risk scoring. The risk calculation can be automatic and continuous. The risk calculation of embodiments may be well suited for IoT and EoT devices. In some embodiments, the risk calculation may be based on detection of anomalies in an IoT entity's behavior using machine learning (ML) techniques. The risk score can be used to offer and determine effective risk mitigation and remediation solutions.

In some embodiments, IoCs and advanced indicators (e.g., ML based indicators) are supported which can include IP reputation, DNS reputation, suspicious network activity, asset criticality based on system mapping, TLS/SSL analysis, asset acquittance, network policy violation, and deviation from normal device behavior, etc. For example, botnets increasingly rely on DNS to connect to their command and control servers, for instance, cnc.mirai.com and iotmirai.tk are Mirai command and control servers. A DNS reputation indicator may be used to detect any DNS requests or incoming/outcoming connections to such malicious domains.

At a high level, embodiments provide an aggregative formula for a risk score or value based on a combination or conjunction of one or more factors (e.g., from one or more different categories). The formula may thus incorporate risk aspects from the several layers including by category (e.g., functional, configurational, and behavioral), by actual or potential factors, and by a formula for each factor (e.g., within a category).

In some embodiments, each factor may be associated with a unique formula, aimed to address each possible scenario. The factor formula may take into consideration an observation count. For example, for open ports a higher count of open ports indicates an increased attack surface. The increased attack surface may thereby increase the risk score. As another example, the more severe known vulnerabilities present, the higher the risk score that would be output (e.g., for a vulnerabilities factor) and increase the overall risk value.

The factor formulas may further take into consideration severity levels. For example, for a known vulnerabilities factor, the formula takes into consideration the severity level of the known vulnerability and the count of known vulnerabilities. As another example, for the open ports factor, there may be two severity levels of 'Gain-Access' and 'Gain-Control' which impact the open port factor value are described here further below. Each factor value (e.g., and associated formula) may be parametrized and easily can be changed (e.g., for fine tuning, updating the formula, etc.)

Embodiments may thus include a multi-layer calculation architecture. Each risk-factor or factor may have its own specific mathematical function or formula that uses various sources of data as an input (e.g., network traffic, classification information, etc.) and returns a score for a specific factor as output. Each factor may be associated with a robust and unique formula, aimed to address each possible scenario. A higher-level formula may be used to aggregate the scores generated by each of the different factors' formulas to determine a risk score of an entity. In some embodiments, one or more mathematical models are used to determine the device risk score. For example, the models may use quantitative measurement of the different calculated factors' scores for determining the output combination (e.g., based on an equation, for instance, applying weights to various factors, taking minimum value, etc.).

In some embodiments, an entity risk score is calculated automatically whenever embodiments detect new information that might affect the risk score. The risk score can also be calculated upon an entity connecting to a network for the first time or reconnecting to the network. For example, the entity risk score calculation can be automatically triggered by: a new entity (e.g., device without a risk score, for instance, joining the network), an entity not having a risk score calculated within a period of time (e.g., the last eight hours, two days, etc.), entity properties changes that might affect the risk score (e.g., classification, open ports, etc.), a new CVE (e.g., associated with an entity), inbound/outbound traffic to a malicious IP address, inbound traffic to an entity (e.g., from the Internet), formula updates or fine tuning of risk models, changes made by a user (e.g., updating an entity criticality score, for instance manually, white labeling a CVE, etc.), etc.

In some embodiments, one or more categories (e.g., functional category 302, configurational category 304, and behavioral category 306) may be independent of the other categories. For example, the configurational category 304 may be independent of behavioral category 306 because a configuration of an entity is separate from the actions of an entity. As another example, a vulnerability in a configuration of an entity is independent of the behavior of an entity (e.g., until the vulnerability is exploited). As another example, an entity that has a known vulnerability (e.g., configurational potential factor) is independent of whether the entity is public facing or has Internet Exposure (e.g., behavioral potential factor).

The factors within each category may be independent, dependent, or loosely-dependent with other factors within a category. Factors that may be exploited without the involvement of another factor may be considered independent. For example, an open share may be independent of (e.g., not related to directly to) a known vulnerability and vice versa because an open share may be exploited without involvement of a known vulnerability.

Factors that may be present together or based on each other may be considered dependent. For example, considering the factors traffic reputation factor 354 and internet exposure 342, traffic to and from an entity may be analyzed to determine the traffic reputation without evidence of communication with a malicious Internet IP. However, if incoming traffic to the entity is initiated from the Internet then the entity may be known to be a public facing entity and therefore exposed to the internet. The traffic reputation 354 factor value (e.g., risk value) may thus be computed (e.g., increased) based on the entity receiving inbound traffic initiated from the Internet. The internet exposure 342 factor may be computed (e.g., increased) based on the entity receiving inbound traffic initiated from the Internet. The traffic reputation 354 factor and internet exposure 342 factor may thus be dependent or have a correlation between them.

Each category may include one or more potential factors, one or more actual factors, or a combination thereof. Potential factors are factors that require some additional operations (e.g., significant additional operations) or conditions in order to threaten an entity (e.g., significantly). For example, a known vulnerability of an entity may be a potential factor with respect to a risk score of the entity because the known vulnerability remains a potential risk until the vulnerability is exploited (e.g., by an attacker taking one or more operations to exploit the vulnerability).

Actual factors can be based on the ability for exploitation (e.g., immediate exploitation), evidence of suspicious, malicious, or other activity, or a combination thereof. For example, an entity with an open port has an increased attack surface, the open port has the ability to be exploited if the service behind the open port has a vulnerability (e.g., a zero day vulnerability, a known vulnerability, etc.). As another example, an entity that has communicated or is suspected of communicating (e.g., above a confidence threshold) with a malicious IP address or malicious entity (e.g., a compromised entity) will have a risk factor computed based on the actual threat associated with the communications.

In some embodiments, actual and potential factors may be related to increased attack surface of an entity. An attack surface of an entity may include any security point of engagement, where a threat actor (e.g., attacker which may include a compromised entity) can initiate attack. For example, each new open port, open share, vulnerability, etc., may give the attacker another point (e.g., the new open port) where he or she can try to compromise an entity. Actual factors that may be related to increased attack surface include open port(s), SSL/TLS analysis, open share(s), and default or weak credentials. Potential factors that may be related to increase attack surface include Internet exposure.

In various embodiments, a factor may change from a potential factor to an actual factor. For example, the End of Life (EOL) proximity factor may be treated as an actual factor when the entity has crossed the announced EOL date and the entity has a vulnerable OS version. Therefore, the EOL factor may be better representative as an actual factor (e.g., the OS can be immediately exploited or leveraged).

In some embodiments, the functional category 302 may represent the impact of an asset or entity. The functional category value associated with an entity may act a coefficient to normalize the resulting risk score computed using a value based on configurational category 304 or behavioral category 306, or a combination thereof. In various embodiments, the value associated with the functional category 302 may be relatively static as to the function (e.g., asset criticality may remain stable over time). For example, an entity that is an MM machine will not change to another device or function, for instance a printer, and thus may maintain a particular asset criticality. The values associated with configurational category 304 and behavioral category 306 may change relatively often as an entity changes (e.g., firmware upgrades, ports opened/closed, credentials changed, etc.) or information about an entity changes (e.g., EOL information, new vulnerabilities, etc.) as compared to functional category 302.

Functional category 302 includes potential factors 310. Potential factors 310 are factors that are probable factors that contribute to the functional risk of an entity. Potential factors may be associated with an entity at risk, e.g., the entity is at risk of being compromised but has not yet been compromised. Potential factors 310 include asset criticality 312 and asset acquittance 314.

Asset criticality 312 may represent the importance of an entity (e.g., within an organization, network, process, etc.). The importance of the entity may be based on whether the entity is responsible or part of crucial procedure, process, infrastructure within an organization or within a network, etc. A threat to the availability, confidentiality or integrity of a high criticality entity could cause significant damage to business functions (e.g., directly, peripherally, a combination thereof, etc.) For example, a surveillance camera system may include multiple cameras and a workstation that is used to control and monitor the feeds from the security cameras. If the workstation or cameras are compromised or stop working, the business or organization may be put at risk. In some embodiments, asset criticality 312 may be determined based on a function mapping that maps one or more entities, network portions (e.g., segments), etc., to one or more business processes or business portions (e.g., production environment, development environment, etc.).

The asset criticality 312 may further be based on network traffic, data from a configuration management database (CMDB), etc. For example, a group of entities that are part of a system, business purpose or process may each have a criticality score (e.g., criticality score per entity) based on their role. As another example, a criticality score for a device may be assigned based on an application the device runs, for instance, a financial application server and associated database servers may be assigned a similar criticality, while an organizational mail server may be assigned a different asset criticality. In some embodiments, asset criticality may be user configured or assigned (e.g., criticality may be assigned on a per entity function, network segment, or entity group basis).

Asset acquittance 314 may be a measure of how well entity is known, controlled, and monitored by the organization. Asset acquaintance may be based on whether an entity is managed or unmanaged, the level of control over the entity, how frequently the entity connects or disconnects from a network, etc. For example, a server which is managed by the organization and has a security agent running may have a relatively high level of asset acquittance as compared to an employee iPad™ which is unmanaged and frequently goes on and off the corporate network.

In some embodiments, asset criticality 312 and asset acquittance 314 may be weighted as 100% of the functional category (with respect to an entity) within the risk value for functional category 302, as shown per weight scale 360.

Configurational category 304 includes potential factors 320 and actual factors 330. Potential factors 320 includes known vulnerabilities 322 and end of life (EOL) proximity 324. Known vulnerabilities 322 is based on a weakness or vulnerability which can be exploited by a threat actor (e.g., attacker), to perform unauthorized actions within a system or entity. Known vulnerabilities 322 may take into consideration the vulnerabilities' available exploits, remediation (e.g., whether a vendor has released a patch or update that will fix the vulnerability), information related to the vulnerability from the deep or dark web (e.g., a hacker forum, Git-Hub repository, an exploit database, etc., mentioning of a vulnerability, exploits, etc.), or a combination thereof. Known vulnerabilities factor 322 may be based on various kinds of vulnerabilities including, but not limited to OS, vendor, model, application, and protocol vulnerabilities.

In some embodiments, one or more vulnerabilities may be determined based on a match between an entity's classification and its vulnerabilities. For example, if an entity is classified as a Microsoft™ Surface Tablet running Windows 10 with a particular patch level, vulnerabilities in that patch level of Windows 10 may be associated with that entity. The known vulnerabilities factor 322 associated with an entity may be adjusted (e.g., increased or decreased) based on the severity, availability, etc., of vulnerabilities associated with the entity.

In various embodiments, one or more vulnerabilities associated with an entity may be determined based on information from one or more other systems (e.g., system 150). This determination process may be automatic (e.g., without user involvement). For example, embodiments may use an automatic process to gather relevant vulnerabilities from one or more third party vendors (e.g., for both IoT and IT entities), threat feed, etc.

In some embodiments, remediation level, available exploit(s), and the known vulnerability popularity (e.g., trending level) aspects associated with a vulnerability may be used in computing a risk score of value associated with the vulnerability. For example, a risk associated with a vulnerability may be higher if there is only a workaround than if an official patch or upgrade has been released. The more exploits (e.g., scripts or other utilities) that are available to take advantage of a vulnerability may increase the risk score associated with the known vulnerabilities 322. The popularity of a vulnerability may increase the known vulnerability 322 value based on mentions by threat actors, presence in an exploit database (e.g., Metasploit), GitHub, or on social media, etc.

End of life (EOL) proximity 324 indicates if a device or entity is near or has passed its announced End of Life or End of Service Life (e.g., which may be announced by a vendor, manufacturer, supplier, etc.). For example, after a manufacturer announces the end of life status of a product, it is likely that security fixes, patches, and firmware updates, etc., for the product will be reduced or eliminated. This may result in vulnerabilities or other issues not getting fixed (e.g., via patches, updates, etc.).

In some embodiments, asset vulnerabilities 322 and end of life (EOL) proximity 324 (configurational potential factors 320) may be weighted as 60% of a risk value for the category with respect to an entity, as shown per weight scale 360.

Actual factors 330 includes open shares 332, default credentials 334, and open ports 336. Open shares 332 value may be determined based on whether an entity has accessible open file shares or other types of shares enabled (e.g., based on active or passive inspection via one or more communications to or from a network monitor device). Embodiments may support detection of open shares for Windows™ entities, Linux™ entities, MacOS™ entities, cloud based entities, etc. For example, an entity without any open shares may be given an open shares value of zero. The value associated with open shares 322 may be based on a formula, as described herein. The value associated with open shares 322 may be based on the permissions of the resources (e.g., folders, files, etc.) of the share. For example, folders or files that have write access may be determined to be riskier because an attacker can modify the files or folder.

Default credentials 334 may indicate whether a service or entity could be accessed by using known default or weak credentials (e.g., provided by a vendor for initial authentication and never changed). Weak or leaked passwords may be treated as default credentials as well. For example, username and password combinations of admin/admin, admin/admin1234, root/12345, etc. The more default or weak credentials that allow access on or to an entity, the higher the default credentials 334 value may be.

Open ports 336 may be based on what current risky open port(s) or accessible services an entity has. The one or more ports may induce a risk to the entity by increasing the attack surface of the entity. For example, port 23 being open will likely indicate that an entity will be susceptible to a telnet connection. The telnet connection to an entity may then be used with one or more default credentials, brute force attacks, or attempts to exploit a vulnerability associated with the entity and thereby compromise the entity.

In some embodiments, important risky ports (e.g., for IoT and IT) may be categorized as 'Gain-Access'(GA) or 'Gain-Control' (GC). Gain-Access or Gain-Control port categories may reflect the potential security impact level of a port (e.g., being open).

A Gain-Access port is a port that a threat actor can potentially gather valuable or actionable information regarding the host entity (e.g., OS type, version), host network (e.g., associated IP ranges), actual running service(s) (e.g., version), a combination thereof, etc. The threat actor may not necessarily need to compromise a gain access port and may use legitimate communication messages. This valuable information may be used later to exploit one or more vulnerabilities or other weaknesses. A Gain-Access port may thus allow an attacker to gather information which may be used for an attack (e.g., at a later point in time, though another means besides the port, etc.).

A Gain-Control port is a port that if compromised, a threat actor can potentially gain partial or full control of an entity, collect valuable information, manipulate the entity, propagate an attack within a network, exploit compromised service privileges (e.g., perform actions using a compromised service that has elevated privileges), a combination thereof, etc. A Gain-Control port may thus allow an attacker to gain control of an entity.

In some embodiments, the open port 336 value may be computed based on an overall number of open ports and the number of ports with a high impact (e.g., $f_{impact\&count}$ and $f_{OverallCount}$ described further herein).

In some embodiments, open shares 332, default credentials 334, and open ports 336 (configurational actual factors 330) may be weighted as 40% of a risk value for the category with respect to an entity, as shown per weight scale 360.

Behavioral category 306 includes potential factors 340 and actual factors 350. Potential factors 340 includes Internet exposure factor 342, secure traffic posture 344, and anomaly detection 346. Internet exposure 342 is a measure of the extent an entity is exposed or faces directly to the public Internet (e.g., public facing). In some embodiments, Internet exposure 342 may be based on an inbound connection or communication from the Internet to an entity. For example, an entity with an inbound connection (e.g., originated from the Internet) to the entity may be given a relatively high Internet exposure 342 risk value.

Secure traffic posture 344 may be based on the security of the protocols used by an entity. Secure traffic posture 344 may be determined based on an entity's connection/traffic security posture, in terms of the used network protocols (e.g., encrypted vs. not-encrypted, whether the protocols have known vulnerabilities, etc.). For example, a value associated with secure traffic posture 344 may be relatively high for an entity using one or more unencrypted protocols and in particular if the entity is using an unencrypted protocol to send credentials in plain text (e.g., Telnet).

Anomaly detection 346 may be determined based on whether an entity deviates from learned previous behavior associated with the entity. The behavior of an entity may be learned by a network monitoring entity (e.g., network monitor device 102 or 280). In some embodiments, a method for intelligently detecting behavioral anomalies of an entity (e.g., using ML) based on the entity's historical behavior and the behavior of similar entities may be used. For example, the behavior, including communications, of a printer may be compared against the printer's historical behavior and other similar printers. Learned behavior may be based on a population of similar entities. For example, the learned behavior for a printer may be based on each of the printers within an organization or network.

In some embodiments, anomaly detection 346 may further be based on detection of an SSL handshake anomaly, suspicious network scans, communication with suspicious domains or IP addresses, a network policy violation, flood attempts, deviation from normal communication or services, a combination thereof, etc. Each of these may increase a value associated with an anomaly detection 346. For example, detection of an entity using weaker encryption the previously used may be treated as an anomaly in the cipher suit of the entity or a SSL handshake anomaly. As another example, an entity attempting connect or communicate with multiple other entities bovver a variety of ports may treated as a suspicious network scan. As another example, a printer trying to access a server in Russia or China (e.g., that it has not previously communicated with) may be treated as communication with a suspicious IP address or domain.

A network policy violation may occur when an entity tries to access a resource that is a deviation from its allowed policy (e.g., allowed network segments, devices, etc.). For example, a security camera trying to access a production server used for running a financial application may be a violation of network policy (e.g., that a security camera or other entities outside of the finance department should not communicate with a financial related entity). As another example, if an entity tries to send large amounts packets or data to one or more entities on a network, may be treated as a flood attempt. As another example, a printer that normally initiates connections to a printer server, that suddenly tries to access other entities communicatively coupled to the network would be a deviation from normal communications (e.g., and likely a violation of a network policy, for instance, that printers should communicate with print servers only).

In some embodiments, Internet exposure factor 342, secure traffic posture 344, and anomaly detection 346 (behavioral potential factors 340) may be weighted as 20% of a risk value for the category with respect to an entity, as shown per weight scale 360.

Actual factors 350 includes secure sockets layer (SSL)/transport layer security (TLS) analysis 352, traffic reputation 354, and malicious activity detection 356. SSL/TLS analysis 352 may be determined based on whether an entity is using state-of-the-art TLS/SSL configuration(s), is exposed to TLS/SSL attacks (e.g., insufficient cipher suite strength), is using valid certificates, a combination thereof, etc. The state-of-the-art TLS/SSL configuration may be determined based on performing a handshake process with an entity to determine if the entity is using the latest TLS/SSL versions and configured properly. The handshake process may also be used to determine the encryption, algorithm, or cipher suite strength of an entity. The cipher suite strength of an entity may be compared against a threshold to determine if the cipher suite strength is considered secure. For example, if the encryption type being used is too weak (e.g., the algorithm provides insufficient security, the level of encryption is of insufficient complexity, for instance 64-bit encryption, etc.), the cipher suite may be considered not secure. If the cipher suite strength (e.g., encryption strength) of the entity is below a threshold, a risk value associated with SSL/TLS analysis 352 may be increased or be set to a high value due to the cipher suite strength being deemed insufficiently secure.

A handshake process may also be used to determine if an entity is using one or more valid certificates. For example, embodiments may initiate communication to an entity to perform the handshake process to determine one or more certificates that the entity may use for recurring communication, etc., which may then be used to evaluate the risk of the entity with respect to SSL/TLS. A certificate may be determined to be valid based on the current time not being past the expiration of the certificate, not being compromised or vulnerable, etc. If an entity is using an invalid or expired certificate, the risk value associated with SSL/TLS analysis 352 may be increased or set to a high value.

Traffic reputation 354 may be a measure of the extent to which an entity communicates (e.g., either through inbound or outbound traffic) with one or more entities that have a high probability of being malicious. In some embodiments, both inbound and outbound may be connections are analyzed to determine if an entity is communication with a malicious IP address or an entity that has been observed communicating with a malicious IP address.

In some embodiments, an exponential function is used to represent the characteristics of traffic reputation 354. An exponential function for this factor may mean that as more traffic is determined to be with malicious entities, one or more IP addresses, etc., this value associated with traffic reputation 354 will increase rapidly. This may reflect the fact that the risk that an entity creates to an organization (and itself) grows rapidly with the amount of communications with a malicious entity, malicious IP address, etc.

In some embodiments, outbound connections may be selectively monitored, analyzed, filtered, or a combination thereof to reduce the number of false positives thereby resulting in noise reduction. For example, there may be many outbound HTTP connections or TLS/SSL communications related to webpages, or SMTP communications related to email which may be excluded from analysis. Embodiments may further focus on particular protocols, for instance, telnet, SSH, SMB, Android device bridge (ADB), SIP, etc. In some embodiments, another system (e.g., system 150) may be used for analysis of HTTP or HTTP connections. Embodiments may thus reduce noise by excluding certain traffic.

In various embodiments, repositories that are used to monitor, analyze, or a combination thereof connections or communications may be checked frequently for updates (e.g., every 5 minutes). For example, a blacklisted or malicious IP address repository may be updated every five minutes based on a latest malicious IP address threat feed. As another example, a CVE repository may be updated every two hours with CVE information updates.

Malicious activity detection 356 may be based on detection of a malicious cyber-security attack including, but not limited to, man-in-the-middle (MitM) attack, IP spoofing, Denial-of-Service (DoS) attack, scanning of a network, etc. For example, a MitM attack, IP spoofing, or a DoS attack being associated with an entity may result in a malicious detection 356 value being increased significantly whereas scanning of a network by an entity may result in a slightly increased malicious detection 356 value.

In some embodiments, SSL/TLS analysis factor 352, traffic reputation factor 354, and malicious activity detection factor 356 (behavioral actual factors 350) may be weighted as 80% of a risk value for the category with respect to an entity, as shown per weight scale 360.

In various embodiments, a sliding window or sliding time window is used to capture the dynamicity of the network (e.g., with respect to the risk of each entity for each factor). For example, the use of a sliding time window will allow the risk value of a factor to decrease or increase over time as the risk of each entity changes (e.g., due to patching of vulnerabilities, opening or closing of one or more ports, detection of anomalies, one or more new known vulnerabilities associated with an entity, communications with a malicious IP address, etc.).

Figure 4:
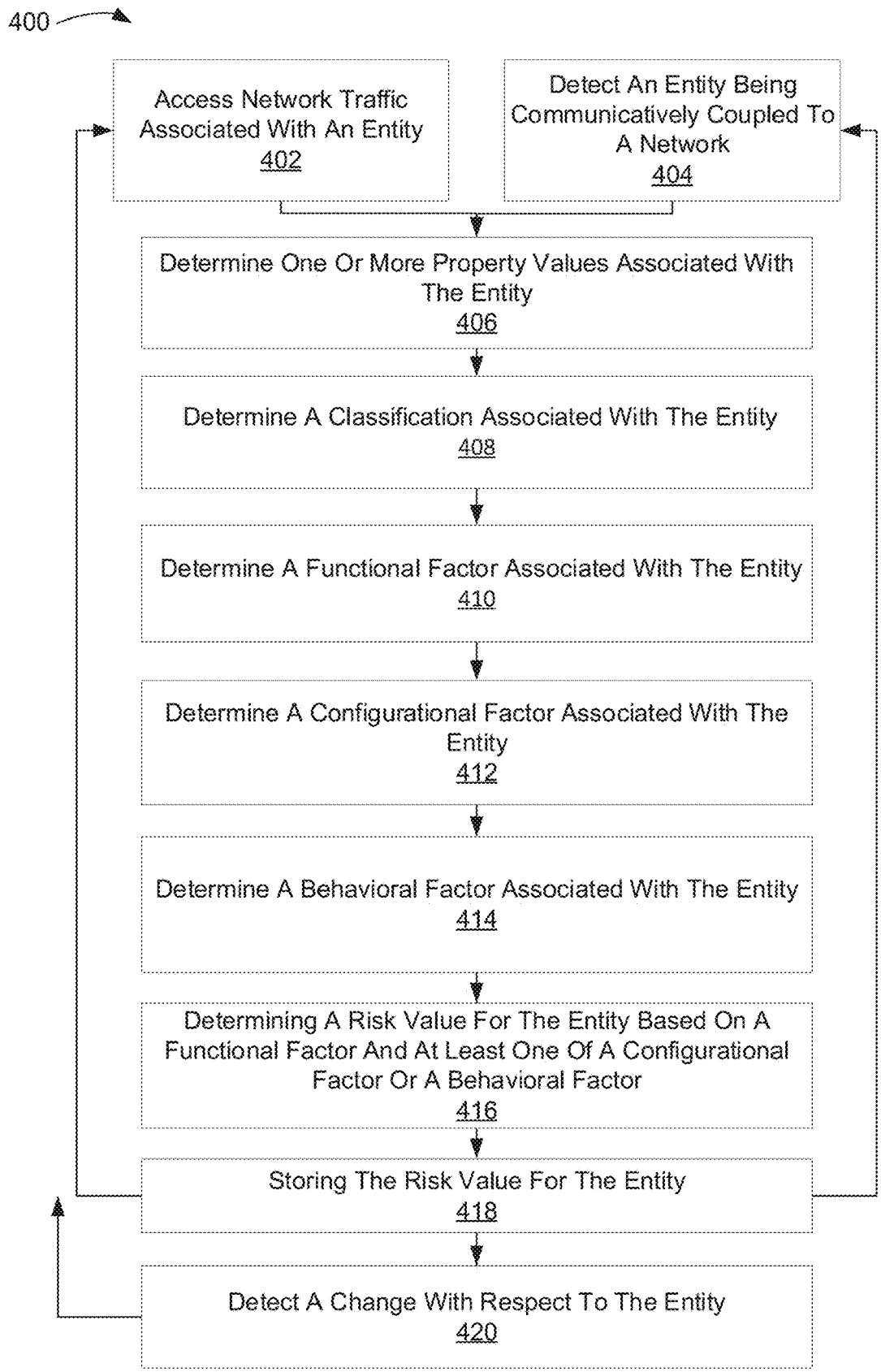
FIG. 4 depicts a flow diagram of aspects of a method for determining a risk score in accordance with one implementation of the present disclosure.

With reference to FIG. 4, flowchart 400 illustrates example operations used by various embodiments. Although specific operation blocks ("blocks") are disclosed in flowchart 400, such blocks are examples. That is, embodiments are well suited to performing various other blocks or variations of the blocks recited in flowchart 400. It is appreciated that the blocks in flowchart 400 may be performed in an order different than presented, and that not all of the blocks in flowchart 400 may be performed.

FIG. 4 depicts a flow diagram of aspects of a method for determining a risk score in accordance with one implementation of the present disclosure. Various portions of flowchart 400 may be performed by different components (e.g., components of system 500) of an entity (e.g., network monitor device 102 or network monitor device 280). Flowchart 400 depicts a process for determining a risk score or value based on one or more factors (e.g., of FIG. 3), as described herein.

At block 402, network traffic is accessed. The traffic may be accessed by a network monitoring entity (e.g., network monitoring devices 102 or 280) via a port mirroring or SPAN port or via another method, as described herein. The traffic data may include one or more properties and property values for each entity communicatively coupled to one or more networks. The one or more properties and property values may be extracted from the traffic data. The traffic may include active scanning properties (e.g., if active scanning is enabled).

In some embodiments, data (e.g., including properties and property values) is further accessed from third party systems (e.g., system 150, an external system, etc.) and used along with traffic data. The data from third party systems may be accessed from the third party systems via a plugin or module of a network monitoring entity. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, an entity itself, etc.

In some embodiments, the network traffic is accessed based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein. An entity being communicatively coupled to the network may be detected (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

In various embodiments, a data store is (optionally) accessed. The data store may be accessed for data to be used in addition to the network traffic for the process of flowchart 400. The data store may be a local or cloud resource (e.g., cloud entity data store 268) with information of various entities (e.g., properties and associated property values). Data from the data store may be accessed to be used to compute a risk score, as described herein. The data store may include entity data (e.g., properties and property values) from one or more network monitoring entities (e.g., network monitor devices 102 and 280) that have been uploaded data. The data store may be organized or configured for use in training or classifying entities. The data store may be part of an external system (e.g., system 150) and include information associated with an entity. The data store may also include information determined based on the performing an Internet search using one or more properties values associated with one or more entities.

At block 404, an entity being communicatively coupled to the network is detected. The entity may be detected upon being communicatively coupled to the network (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed. The entity that has been detected may be selected for determining a risk score therewith.

At block 406, one or more properties associated with an entity of the network are determined. The one or more properties may be determined in a variety of ways. The properties can include data or values determined by extracting data or values (e.g., a portion of a field of a packet, one or more fields of a packet, etc.) from network traffic (e.g., packets) associated with each entity. For example, one or more properties and property values may be determined by accessing or selecting the properties values based on one or more keywords or variables associated with one or more portions of a packet, protocol fields, information from Nmap, information from p0f, data from active scans (e.g., probing or sending requests to an entity), etc. Each property may be stored as a property key (e.g., property name) and value (e.g., data of the property) pair. The properties may include network interface card (NIC) vendor (e.g., portion of a MAC address), dynamic host control protocol (DHCP) vendor class, HTTP user agent string, operating system (OS) data, network function, transmission control protocol/internet protocol (TCP/IP) Syn Ack fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, classified by action or operator classified, device is a NAT device, Windows™ services installed, and switch port name. The properties associated with an entity may be represented as key (e.g., property or property name) value sets where each property is associated with one or more associated values (e.g., a value from a portion of a packet). The properties can thus be accessed from one or more packets being transmitted over the network agentlessly or without involvement of an agent (e.g., software for collecting the properties running on the entity sending the packets). In yet other embodiments, properties may be determined in other ways.

The properties may further include identification information (e.g., serial number, etc.), device categorization, user categorization, location, compliance, risk, or a combination thereof which may be based on fingerprints, signatures, entity behavior, etc., as described herein. Embodiments are able to determine the one or more properties, or other aspects of an entity agentlessly (e.g., based on observing network traffic without needing software running on the entity to access the properties) thereby allowing properties or other aspects of an entity to be quickly determined for entities that do not have or support an agent as well as without needing an agent to be installed for entities that do support an agent. In some embodiments, the one or more properties or other aspects are determined in real-time (e.g., instantaneously or substantially instantaneously). For example, a compliance characteristic may be determined based on an antivirus scan that is specified in a network access policy.

Properties may be collected or accessed from various of sources including, from the entity, from the network environment, network devices or enforcement points (e.g., one or more switches, routers, firewalls, etc.) and any other entity or resource communicatively coupled to the network (e.g., network 100) including other systems (e.g., system 150). The properties may be determined by an entity (e.g., network monitor device 102 or network monitor device 280) that is configured to perform one or more blocks of flowchart 400.

At block 408, a classification of the entity is determined. The classification of the entity may be determined using a model (e.g., ML model) based classification, profile based classification, rules based classification, fingerprint based classification, etc., or a combination thereof. The entity may be classified based on the properties and property values associated with the entity (e.g., based on network traffic, a data store, etc., as described herein). If the entity cannot be classified (e.g., with a confidence above a threshold), the classification result will be unclassified. The classification may include one or more classification attributes including vendor, function, operating system. The classification may be output as a vector, a matrix, or other data structure including one or more classification attributes in numerical form, one or more probabilities or confidences scores associated with each classification attribute, as described herein. In some embodiments, the classification may be part of an initial discovery of one or more entities of a network.

At block 410, a functional factor associated with the entity is determined. The determination of the functional factor may be based on one or more factors including asset criticality (e.g., asset criticality 312), asset acquaintance (e.g., asset acquaintance 314), etc. In some embodiments, the functional factors represent the impact portion of the risk calculation (e.g., risk=impact×likelihood).

The functional factor may be determined in a variety of ways. A functional factor may be determined based on one or more passive scans of an entity, one or more active scans of an entity, network traffic monitoring, information from another system, user configuration (e.g., setting criticality level, acquittance level, etc.), or a combination thereof.

The one or more passive scan may be used to determine ports that are open an entity due to the entity using those ports for communications, handshakes, establishing connections to one or more other entities, etc.

Asset criticality is how critical or important an entity is to an organization. For example, a router which communicatively couples one or more networks to the Internet, for instance, including cloud resources, may be considered to have high criticality. The criticality of the router can be considered high because if the router is compromised or fails, the operations of an organization may substantially slow down or be halted. As another example, a VOIP phone may be considered to be medium criticality because if the VOIP phone is compromised, the impact to the organization will be of medium impact (e.g., one or more employees may be unable to make calls with the VOIP phone).

In some embodiments, an entity asset criticality score may be based on criticality level according this function:

$$f(\text{Criticality Level}) = \begin{cases} 0.8, & \text{Low} \\ 0.9, & \text{Medium} \\ 1, & \text{High} \end{cases}$$

Where the asset criticality value for a low criticality level entity is 0.8, the asset criticality value for a medium criticality level entity is 0.9, and the asset criticality value for a high criticality level entity is 1. It is noted that asset critically (and functional factors) may decrease an overall risk score (e.g., based on criticality of an entity being lower). Embodiments may support more or different criticality levels.

In various embodiments, a criticality level of an entity may be user configured, from another system (e.g., system 150), may be based on a mapping of each entity to one or more business processes and associated criticality of the business processed (e.g. by a network monitor entity, by another system, etc.), as described herein. A criticality level may be assigned or set for a portion of a network. For example, a user could assign a criticality of a segment to be high and each entity in the segment may inherit the criticality level of the segment.

Asset acquittance is a measure of how well entity is known, controlled, and monitored by the organization. Asset acquaintance may partially address 'Bring Your Own Device' (BYOD) security risk issues (e.g., malware infiltration to the organization). Asset acquaintance may be based on whether an entity is managed or unmanaged (e.g., including controlling or monitoring for unwanted applications, insecure connections, etc.), the level of control over the entity, how frequently the entity connects or disconnects from a network, etc. The higher the level of acquaintance (e.g., the more familiar an entity is to the network) the lower the acquaintance factor value may be (e.g., due to the entity inducing less risk to the network). Similarly, the lower the level of acquaintance, the higher the acquaintance factor value may be (e.g., due to the entity inducing more risk to the network).

At block 412, a configurational factor associated with the entity is determined. The configurational factor may be determined using one or more property values associated with an entity, a classification of the entity, informational from another system (e.g., system 150) associated with the entity, open ports, open shares, credentials, etc.

A configurational factor may be based on one or more factors including known vulnerabilities (e.g., known vulnerabilities 322), end of life (EoL) proximity (e.g., EoL proximity 324), open shares (e.g., open shares 332), default credentials (e.g., default credentials 334), open ports (e.g., open ports 336), etc. In some embodiments, information from another system (e.g., system 150) associated with the entity may be used to determine a configurational factor (e.g., known vulnerabilities, EoL proximity, open share(s), default or weak credentials, or open port(s), etc.). In various embodiments, network traffic may indicate that an entity has open ports or open shares, e.g., based on communications or connections to an open port or an open share which can be observed in network traffic.

In some embodiments, one or more passive scans of the entity, one or more active scans of the entity, or a combination thereof may be used to determine one or more of open shares, open ports, credentials (e.g., weak or default credentials). The active scanning or probing may include perform a scan using Nmap (available from nmap.org).

In various embodiments, the configurational factor may be based a known vulnerabilities value may be determined based one or more vulnerabilities (e.g., CVEs) associated with an entity. A vulnerability of an entity may be determined based on a classification or one or more property values associated with an entity. For example, if an entity is classified as a VOIP device manufactured by company A with model number 2500, that information may be matched against known vulnerability information (e.g., a CVE which applies to a VOIP model number 2500 made by company A).

In some embodiments, the known vulnerabilities value associated with an entity is determined based one or more vulnerabilities associated with the entity. For example, CVEs before a particular date ($CVE_{startyear}$) may be filtered out (e.g., before 1999 or 2005). CVEs may further be sorted in descending order by CVSS and in descending order by CVE date. A maximum number of records (MR) of the CVE records may be selected (e.g., 20 CVE records). The CVEs may be divided into a number of groups or buckets (Bks). For example, a low bucket for CVEs with a CVSS of 0-3.9, a medium bucket for CVEs with a CVSS of 4-6.9, a high bucket for CVEs with a CVSS of 7-8.9, and a critical bucket for CVEs with a CVSS of 9-10. A number of vulnerabilities (S) within each bucket may be determined. For example, the count may be expressed as S: {L:3, M:3, H:5, C:9}, where there are three CVEs in the low bucket, there are three CVEs in the medium bucket, there are five CVEs in the high bucket, and there are nine CVEs in the critical bucket. An entity's score may be based on the vulnerability in the most critical bucket (e.g., normalized according the number of vulnerabilities within the bucket). $CVE_{startyear}$, MR, Bks, and bucket ranges may be parameters for determination of a known vulnerabilities value.

The known vulnerabilities value may be determined according to the function:

If $(X_{Cr}>0)$:return $y=(0.05*X_{Cr})+9$;

Else if $(X_{Hg}>0)$:return $y=(0.1*X_{Hg})+7$;

Else if $(X_{Med}>0)$:return $y=(0.15*X_{Med})+4$;

Else return $y=0.2(X_{Low})$;

Where $X_{Cr}$ is the number of vulnerabilities (e.g., CVEs) in the critical bucket, $X_{Hg}$ is the number of vulnerabilities (e.g., CVEs) in the high bucket, $X_{Med}$ is the number of vulnerabilities (e.g., CVEs) in the medium bucket, and $X_{Low}$ is the number of vulnerabilities (e.g., CVEs) in the low bucket. The first numerical value of y equation is the slope (e.g., 0.05 for $X_{Cr}$) and the last number value is a coefficient (e.g., 9 for $X_{Cr}$).

Figure 7A:
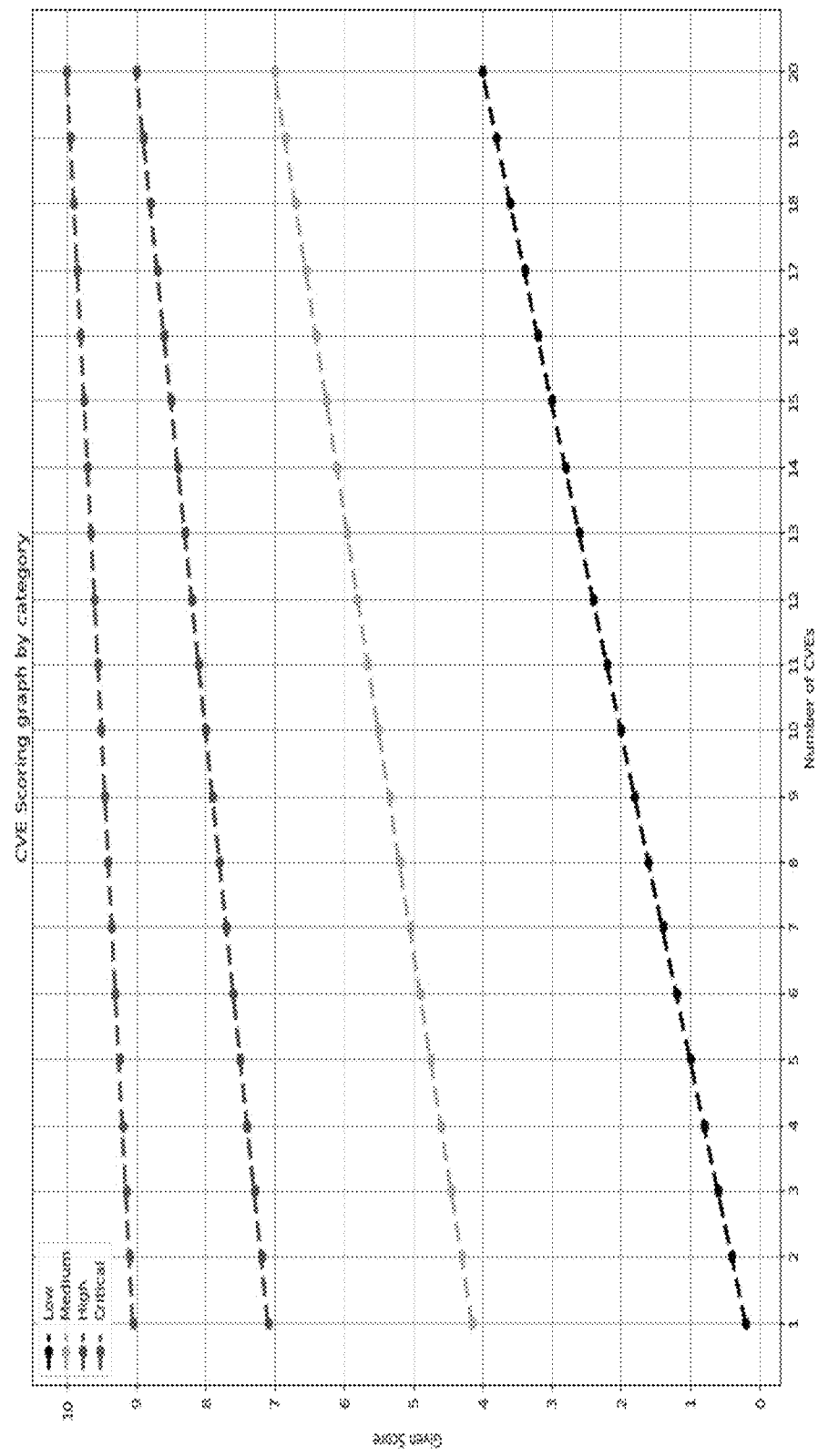
FIGS. 7A and 7B depict example graphs of a known vulnerabilities score and the number of vulnerabilities, in accordance with one implementation of the present disclosure.
Figure 7B:
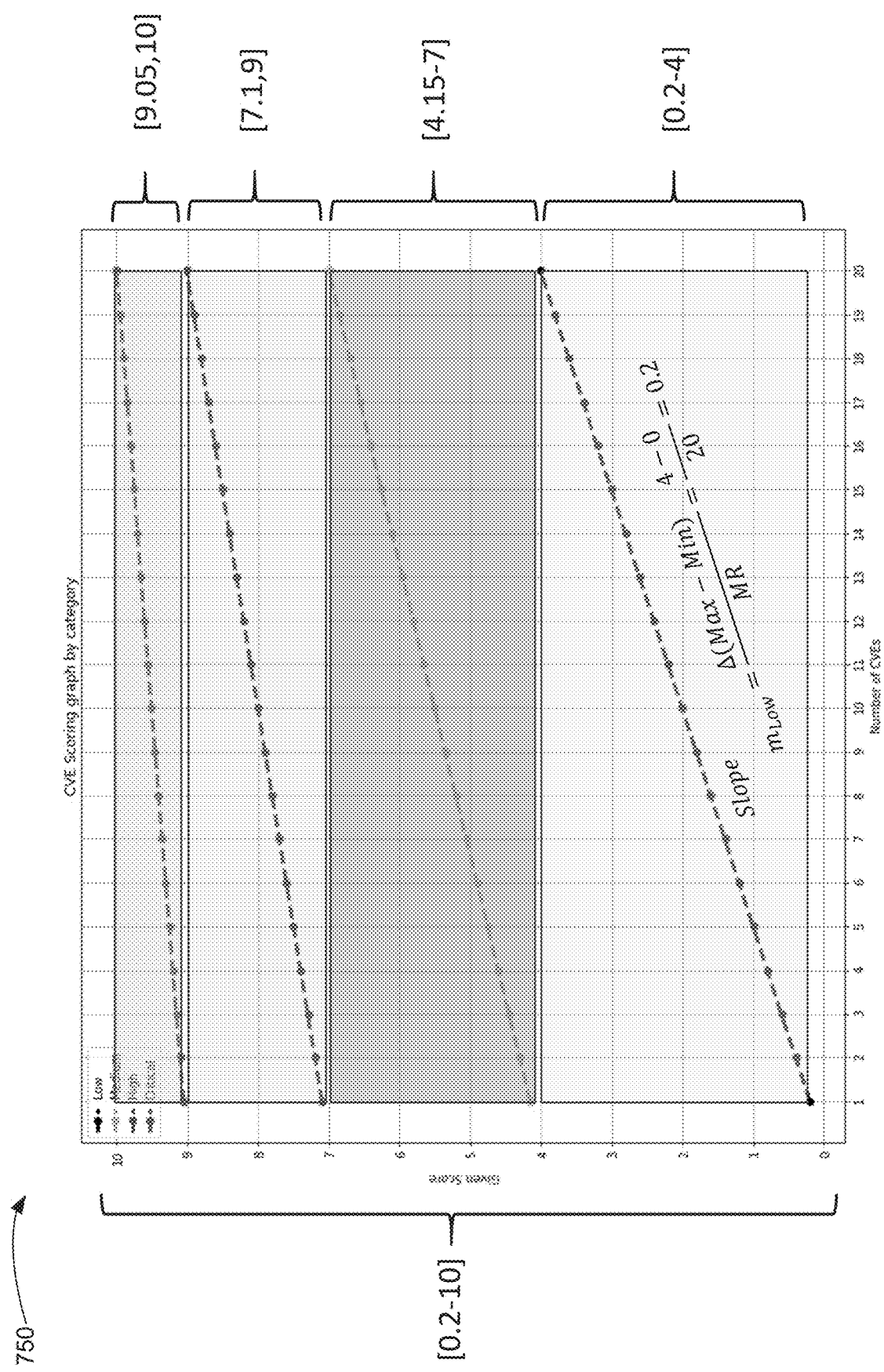

FIGS. 7A and 7B depict example graphs of a known vulnerabilities score and the number of vulnerabilities, in accordance with one implementation of the present disclosure. FIG. 7A depicts an example graph 700 of a CVE scoring graph by category (e.g., based on the above function). FIG. 7B depicts an example graph 750 of CVE scoring graphs by category with a range of each category shown.

In some embodiments, the configurational factor may be based on an EoL proximity value. The EoL proximity value may be based on whether EoL information associated with an entity is available, if EoL information is available, the amount of time left before EoL of an entity goes into effect or if an EoL date has passed. For example, as an EoL date approaches, the EoL proximity value may increase (e.g., exponentially, linearly, etc.) and may reach a maximum value upon the EoL date being past.

In some embodiments, the configurational factor may be based on an open shares value. The open shares value may be based on the number of open shares (e.g., folders, files, cloud resources, etc.) of an entity and the permissions associated with each open share, as described herein (e.g., with respect to open shares 332). For example, for each open share (e.g., accessible with default credentials, no authentication, etc.), the open shares factor value may be increased. Embodiments may differentiate between the share types (e.g. an SMB share may be deemed riskier than other shares). The open shares factor value may further be based on the permissions within the share (e.g., read or write access).

In some embodiments, the configurational factor may be based on a credentials value. The credentials value may be based on whether weak or default credentials grant any level of access to an entity, as described herein (e.g., with respect to default credentials 334). For example, the credentials factor value may be based on default credentials (e.g., username and password given by a vendor, which may be publicly known and available). The credentials factor value may increase significantly when a service is accessible by leveraging default or weak credentials.

In some embodiments, the configurational factor may be based on an open ports value. The open ports value may be determined based on the number of open ports, whether the open ports are Gain-Access or Gain-Control ports, etc., as described herein (e.g., with respect to open ports 336). One or more ports associated with an entity may be determined based on network activity or network traffic. For example, an entity receiving an inbound connection on a port may indicate that the port is open.

In various embodiments, the open ports value may be based on the equation:

$$R_{OPsFactor} = \alpha * f_{Impact\&Count}(X) + \beta * f_{OverallCount}(OPs)$$

Where $R_{OPsFactor}$ is the factor score value of risk associated with the one or more open ports. $\alpha$ and $\beta$ are weights applied to balance and emphasize the significance between $f_{Impact\&Count}(X)$ and $f_{OverallCount}(OPs)$ functions respectively, X is a count of the most severe impact ports, $f_{Impact\&Count}(X)$ computes or determines a risk portion based on the impact level and their respective count of the open ports, OPs is a set of an entity's open ports, and $f_{OverallCount}(OPs)$ computes or determines a risk portion based on the overall count of ports that are open. In some embodiments, $\alpha$ is 85% or 0.85 and $\beta$ is 15% or 0.15.

In some embodiments, the $f_{OverallCount}(OPs)$ function may be:

$$f_{OverallCount}(OPs) = \begin{cases} \frac{9|OPs| - 2}{7}, & |OPs| \le OC_{Th} \\ 10, & |OPs| > OC_{Th} \end{cases}$$

Where OPs is a list of an entity's open ports and $OC_{Th}$ is a threshold value to maximize overall count score portion and |OPs| refers to the set size or total number of open ports. $OC_{Th}$ may be user configured, preconfigured, etc., and is configured to cause $f_{OverallCount}(OPs)$ to output a maximum value (e.g., 10) when the number of ports open on an entity is greater than $OC_{Th}$ (e.g., 8).

In some embodiments, the open ports of an entity may be categorized as "Gain-Control" or "Gain-Access." A Gain-Access port (e.g., when open) can allow gathering or collecting of information about an entity (e.g., services, service versions, application records, application storage, etc.) and may be used to facilitate development of an attack vector (e.g., exploiting a vulnerability). A Gain Access port may further allow access to sensitive information from the entity (e.g., file contents, one or more databases, service data leakage, etc.). For example, HTTP may be Gain-Access port because information may be gathered about an entity based on HTTP requests. An attacker may thus get banner information or possibly understand the certificate an entity is using, which creates potential risk but it is relatively low (e.g., as compared to a Gain-Control port). In some embodiments, Gain-Access ports may be associated with low severity, low impact, or low danger protocols, e.g., HTTP, DNS, POPS, etc.

A Gain-Control port (e.g., when open) can allow full or partial control of an entity. A Gain-Control port may further allow an attacker to use an entity to infect, compromise, etc., other entities in a network (e.g., propagate an attack through the network). For example, Telnet may be a Gain-Control port because telnet may be used to take control of an entity via a shell or command prompt. In some embodiments, Gain-Control ports may be associated with protocols that may grant control of an entity, e.g., telnet, SSH, remote desktop protocol (RDP), etc.

The function $f_{Impact\&Count}(X)$ may determine a value based on selecting the most severe open ports (e.g., Gain-Control ports). For example, if there are one or more Gain-Control ports open then $f_{Impact\&Count}(X)$ will compute a value based on the Gain-Control ports (e.g., while not using the Gain-Access ports). As another example, if there are no Gain-Control ports open then $f_{Impact\&Count}(X)$ may compute a value based on any open Gain-Access ports.

The respecting count is how many ports fall under the most severe open port category (e.g., Gain-Control if any such ports are open). For example, if an entity has a Telnet port open, an SSH port open, and a DNS port open, the respecting count will be two because both the Telnet port and the SSH port are open and are Gain-Control ports.

In some embodiments, the $f_{Impact\&Count}(X)$ function may be:

$$f_{Impact\&Count}(X) = \begin{cases} \text{Gain} - \text{Control:} \\ \frac{19}{20}X + \frac{143}{20}, X \le GC_{Th} \\ 10, \quad X > GC_{Th} \\ \text{Gain} - \text{Access:} \\ \frac{4X + 24}{7}, \quad X \le GA_{Th} \\ 8, \quad X > GA_{Th} \end{cases}$$

Where X is a count of the most severe impact ports, $GC_{Th}$ is a threshold value to maximize the Gain-Control portion of the open ports score portion, $GA_{Th}$ is a threshold value to maximize the Gain-Access portion of the open ports score portion. $GC_{Th}$ may be user configured, preconfigured, etc., and may cause $f_{Impact\&Count}(X)$ to output a maximum value (e.g., 10) when the number of Gain-Control ports open on an entity is greater than $GC_{Th}$ (e.g., 3 Gain-Control ports open). $GA_{Th}$ may be user configured, preconfigured, etc., and may cause $f_{Impact\&Count}(X)$ to output a maximum value (e.g., 10) when the number of Gain-Access ports open on an entity is greater than $GA_{Th}$ (e.g., 8 Gain-Access ports open).

Figure 8A:
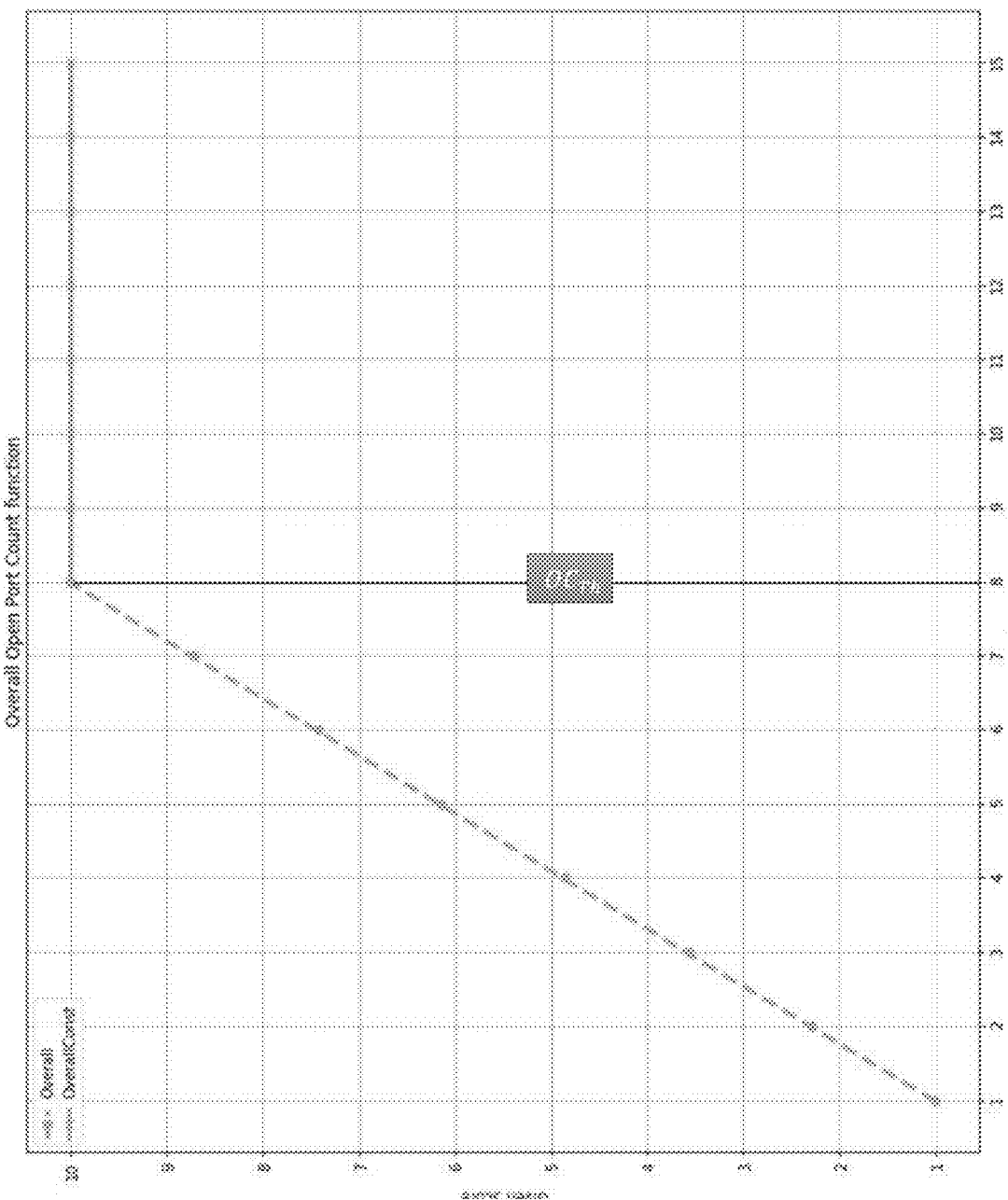
FIGS. 8A and 8B depict example graphs of open port scores and the number of open ports, in accordance with one implementation of the present disclosure.
Figure 8B:
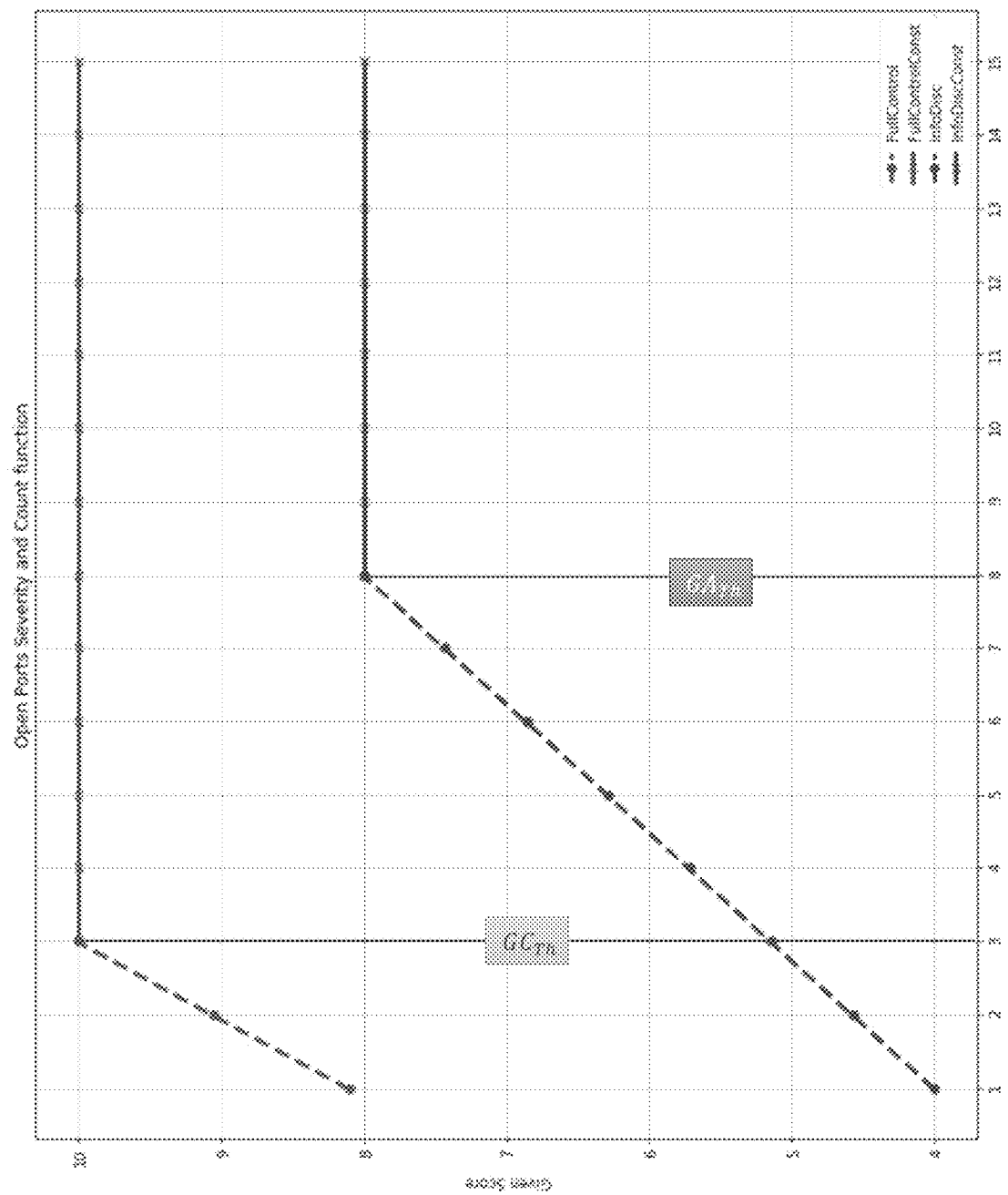

FIGS. 8A and 8B depict example graphs of open port scores and the number of open ports, in accordance with one implementation of the present disclosure. FIG. 8A shows an score based on the number of overall count of the open ports (e.g., $f_{OverallCount}(OPs)$). As shown, the score reaches a maximum value when the number of open ports is greater or equal to an overall count threshold (e.g., $OC_{Th}$). FIG. 8B shows an open port score based on the impact and count of the open ports (e.g., based on $f_{Impact\&Count}(X)$). The score reaches a maximum value when the number of Gain-Control open ports is greater or equal to a Gain-Control threshold (e.g., $GC_{Th}$). The score also reaches a maximum value when the number of Gain-Access open ports is greater or equal to a Gain-Access threshold (e.g., $GA_{Th}$).

In some embodiments, the Gain-Access and Gain-Control ports are pre-determined. In various embodiments, the Gain-Access and Gain-Control ports may be user configured or if pre-determined may be further configured by a user. Table II below shows Gain-Access ports, Gain-Control ports, and associated details. Embodiments may support other ports being Gain-Access ports or Gain-Control ports beyond those of Table II.

TABLE II

| port | service name | Protocol | IoT/IT | Impact Level |
|---|---|---|---|---|
| 22, 2222 | SSH | TCP | Both | Gain-Control |
| 23, 2323 | Telnet | TCP | Both | Gain-Control |
| 5800 | VNC over HTTP | TCP | IT | Gain-Control |
| 8291 | Winbox RouterOS | TCP | Both | Gain-Control |
| 5900-3 | VNC server | TCP | IT | Gain-Control |
| 7547 | TR-069/064 | TCP | Both | Gain-Control |
| 5555 | ADB | TCP | IoT | Gain-Control |
| 3389 | RDP | TCP | IT | Gain-Control |
| 80, 81, 8080, 8081, 8888, 8000, 88, 8008, 8090, 631 | HTTP | TCP | Both | Gain-Access |
| 443, 8443 | HTTPS | TCP | Both | Gain-Access |
| 554 | RTSP | TCP | Both | Gain-Access |
| 5060, 5061 | SIP | UDP/TCP | Both | Gain-Access |
| 69 | TFTP | UDP | Both | Gain-Access |
| 21, 2121 | FTP | TCP | Both | Gain-Access |
| 161 | SNMP | UDP | Both | Gain-Access |
| 1443 | MSSQL | TCP | IT | Gain-Access |
| 9200 | Elastic | TCP | IT | Gain-Access |
| 3306 | MySQL | TCP | IT | Gain-Access |
| 5432 | PostgreSQL | TCP | IT | Gain-Access |
| 27017 | MongoDB | TCP | IT | Gain-Access |
| 8087 | Riak | TCP | IT | Gain-Access |
| 6379 | Redis | TCP | IT | Gain-Access |
| 9160 | Cassandra | TCP | IT | Gain-Access |
| 5601 | Kibana | TCP | IT | Gain-Access |
| 5984 | CouchDB | TCP | IT | Gain-Access |
| 445, 139 | SMB | TCP | Both | Gain-Access |
| 25 | SMTP | TCP | Both | Gain-Access |
| 143 | IMAP | TCP | IT | Gain-Access |
| 53 | DNS | TCP/UDP | IT | Gain-Access |
| 110 | POP3 | TCP | IT | Gain-Access |
| 49152, 52869 | UPNP | TCP | Both | Gain-Access |
| 5431 | UPNP | TCP | Both | Gain-Access |
| 1900 | UPNP | UDP | Both | Gain-Access |
| 37215 | UPNP | TCP | Both | Gain-Access |
| 1883 | MQTT | TCP | Both | Gain-Access |
| 3702 | WS-Discovery | TCP/UDP | IoT | Gain-Access |
| 37777 | application | TCP | IoT | Gain-Access |
| 1723 | PPTP | TCP | Both | Gain-Access |

At block 414, a behavioral factor associated with the entity is determined. The behavioral factors may include secure communication analysis (e.g., SSL/TLS analysis), traffic reputation, malicious activity detection, Internet exposure, secure traffic posture, and anomaly detection.

The behavioral factor may be determined based on one or more passive scans of an entity, one or more active scans of an entity, network traffic monitoring, information from another system, user configuration (e.g., setting criticality level, acquittance level, etc.), or a combination thereof. The one or more passive scan may be used to determine ports that are open an entity due to the entity using those ports for communications, handshakes, establishing connections to one or more other entities, etc.

The behavioral factor may be based on one or more factors including Internet exposure (e.g., Internet exposure 342), secure traffic posture (e.g., secure traffic posture 344), anomaly detection (e.g., anomaly detection 346), SSL/TLS analysis (e.g., SSL/TLS analysis 352), traffic reputation (e.g., traffic reputation 354), and malicious activity detection (e.g., malicious activity detection 356). Traffic data or network traffic data used for determining each of behavioral factors described herein and detailed further below.

In some embodiments, the behavioral factor may be based on an Internet exposure value. The Internet exposure value may be based on determining that an entity has received or had a connection that was initiated from the public Internet. Such a connection is an indicator that the entity is an Internet-facing or public facing. An Internet-facing entity is exposed to remote threat actors (e.g., attackers outside an organization and may be located anywhere on the planet). Remote threat actors can be increasingly dangerous. A remote attacker may exploit one or more one day or zero days vulnerabilities to gather intelligence, access sensitive data, and in some cases gain full control of one or more entities, which eventually might threaten an entire organizational network. A one day or zero day vulnerability is a vulnerability that is unknown to those who should or would be interested in mitigating the vulnerability, for instance, the company making the product or users of the product with the vulnerability is not even aware of the vulnerability. Internet exposure of an entity can suggest a failure in a firewall or other security product deployment (e.g., unintentional or intentional). Internet exposure may be related to open ports because a connection may be established from the Internet directedly to a port of an entity.

In some embodiments, the determination if an entity received a connection initiated from the public Internet is based on a source IP address (e.g., of the connection). The source IP address may be checked to determine if the source is not within a known reserved private internal IP address range (e.g., 0.0.0.0/8, 10.0.0.0/8 (Class B), 100.64.0.0/10, 127.0.0.0/8, 169.254.0.0/16, 172.16.0.0/12, 192.0.0.0/24, 192.0.2.0/24, 192.88.99.0/24, 192.168.0.0/16, 192.18.0.0/15, 198.51.100.0/24, 203.0.113/24, 240.0.0.0/4, 255.255.255.255/32, 224.0.0.0/4, etc.) or within an internal network using public IP address ranges.

Internet exposure may be determined based on monitoring traffic including incoming and outgoing connections of an entity. In some embodiments, Netflows traffic and packets are inspected (e.g., via a packet engine) to determine if a connection to an entity has been made from the Internet. In various embodiments, Internet exposure may be determined based on actively attempting to initiate a connection from the Internet to an entity.

The value for Internet exposure may be determined using the function:

$$f_{IE}(X) = \begin{cases} 10, & X \geq Th \\ 0, & X < Th \end{cases}$$

Where X is a number of indication(s) of inbound connections (e.g., from the Internet based on Netflows or packet inspection), Th is a threshold value that maximizes the Internet exposure value. In some embodiments, the value (e.g., initial value) of Th is one. For example, this means that if an entity has at least one inbound connection from the Internet in a timeframe T, the entity is facing significant higher risk and has a higher risk value (e.g., return a value of 10).

In some embodiments, the configurational factor may be based on a secure traffic value. The secure traffic value may be based on whether an entity is using secure protocols to communicate, as described herein (e.g., with respect to secure traffic posture 344). The secure traffic (risk) value will increase as the number of insecure protocols are used by an entity. The secure traffic value may be based on one or more protocols an entity uses which are analyzed using a distribution model that represents the amount of encrypted versus unencrypted protocols used on a per entity basis or learned by the population of entities (e.g., within an organization). For example, for each use of a clear text or insecure protocol, the secure traffic factor (risk) score value may be increased.

In some embodiments, the configurational factor may be based on an anomaly detection value. The anomaly detection value may be based on variances of an entity's traffic as compared to a baseline, as described herein (e.g., with respect to anomaly detection 346). For example, the anomaly detection value may be based on learned behavior (e.g., learned from network traffic, for instance, based on destination IP addresses and destination ports, number of packets, flow size or volume, etc.). The learned behavior may further be based on determining whether an entity performs actions that conforms the pre-learned pattern or deviates (e.g., with a specified level or degree) from the learned behavior. As the entity deviates from baseline or learned behavior, the anomaly detection factor score value increases. This reflects a case where the entity might be infected or compromised.

In some embodiments, the configurational factor may be based on SSL/TLS analysis. The SSL/TLS analysis value may be based on whether an entity is using a cipher suite of insufficient strength, using valid certificates, etc., as described herein (e.g., with respect to SSL/TLS analysis 352). For example, the SSL/TLS analysis value may be based determining whether an entity is threatened by TLS/SSL attacks (e.g., using insecure encryption or cipher suite, weak certificates, etc.). The impact of such attacks may be significant and, for example, may allow a threat actor to hijack one or more encrypted sessions. As more misconfiguration or weaknesses of SSL/TLS is determined, the SSL/TLS analysis factor (risk) value may be increased.

In some embodiments, the configurational factor may be based on a traffic reputation value. The traffic reputation value may be determined based on communication of an entity with a malicious or blacklisted IP address, as described herein (e.g., with respect to traffic reputation 354). Both inbound and outbound communications may be monitored. Inbound connections may be monitored to detect malicious communication and initiation attempts (e.g. DDoS attacks, infection, etc.). Outbound communications may be monitored to detect a malicious access attempt by an internal entity (e.g., to a command and control system, for instance, part of a botnet). In some embodiments, one or more ports may be excluded from traffic reputation analysis in order to reduce noise. For example, HTTP port (TCP/80), HTTPS port (TCP/443), SMTP (TCP/25, 2525, 587), or a combination thereof may be excluded from traffic reputation analysis.

The traffic reputation value may be based on the function:

$$f(Th, X) = \begin{cases} 10 * \frac{2^X - 1}{2^{Th} - 1}, & X \leq Th \\ 10, & X > Th \end{cases}$$

Where $f(Th, X)$ is the traffic reputation value, X is number of unique malicious or blacklisted IPs (e.g., determined from communications), Th is a threshold value for when the traffic reputation score should reach its maximum value.

In some embodiments, X may be an aggregate number of unique malicious IP address indicators over a period of time (T) (e.g., T=12 hours). The threshold Th may be set to five to reach the maximum value. If there are no detected communications with malicious IP addresses the traffic reputation value may be zero. In various embodiments, the amount of communications with each malicious IP address may be aggregated to allow prioritization of the communications that should be investigated or blocked (e.g., based on the total number of communications associated with a malicious IP address). In some embodiments, the amount of communications with each malicious IP address may be aggregated based on inbound and outbound connections to allow prioritization of the communications that should be investigated or blocked (e.g., based on the number of inbound connections).

In various embodiments, the traffic reputation is based on an exponential function so that a single false positive may not have an unduly large impact. As more connections, e.g., a second and third connection to a malicious IP, are made, the traffic reputation score will climb rapidly or substantially (e.g., until a threshold is met and then the score will become the maximum value).

Figure 9:
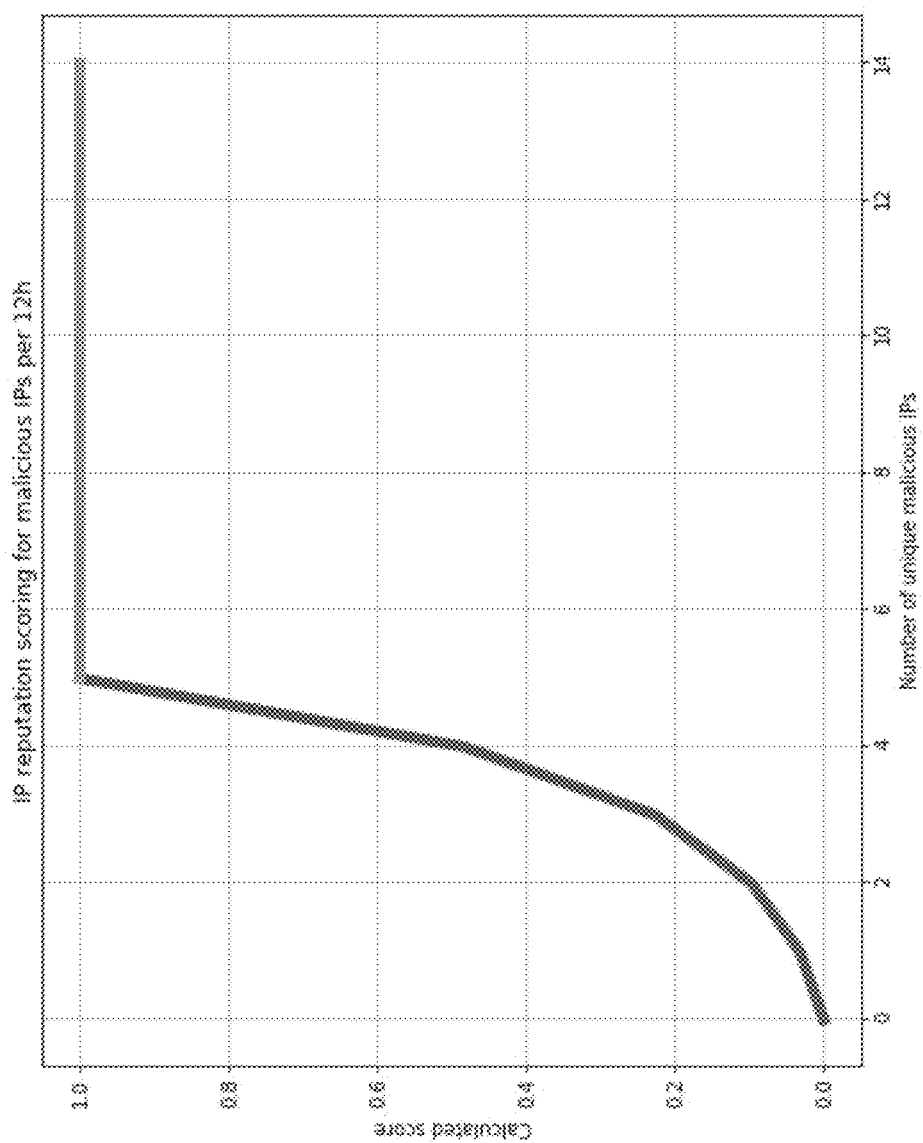
FIG. 9 depicts an example graph of a traffic reputation score or value based on a number of malicious IP addresses, in accordance with one implementation of the present disclosure.

FIG. 9 depicts an example graph of a traffic reputation score or value based on a number of malicious IP addresses, in accordance with one implementation of the present disclosure. Example graph 900 shows traffic reputation value or score based on the number of unique malicious IP addresses (e.g., that were communicated with by an entity).

In some embodiments, a user may whitelist or configure a specific IP address to be ignored from being used for the traffic reputation value computation. For example, a malicious IP address that is no longer a malicious IP address or associated with an internal IP address, may be configured by a user so that embodiments do not use communications with that IP address to impact a risk value of one or more entities.

In some embodiments, the behavioral factor may be based on malicious activity, as described herein (e.g., with respect to malicious activity detection 356). The malicious activity value may be based on detection of a malicious cybersecurity attack including, but not limited to, man-in-the-middle (MitM) attack, IP spoofing, Denial-of-Service (DoS) attack, scanning of a network, etc.

At block 416, a risk value for the entity is determined based on a functional factor and at least one of a configurational factor or a behavioral factor. As described herein, the risk value may be based on an equation that uses the available values for each category of risk (e.g., actual factors, potential factors, or a combination thereof for each category) to compute an overall risk score for an entity.

The risk score or value for an entity can then be computed using the equations:

$$\text{Risk} = \min \left( \sum_{\substack{fnc-fct \in \\ \text{Functional} \\ \text{Factors}}} (W_{fnc-fct} \times f_{fnc-fct}) \times \left[ \sum_{\substack{cnfg-fct \\ \text{Configurational} \\ \text{Factors}}} (W_{cnfg-fct} \times f_{cnfg-fct}) + \right. \right.$$

$$\left. \sum_{\substack{bvrl-fct \in \\ \text{Behavorial} \\ \text{Factors}}} (W_{bvrl-fct} \times f_{bvrl-fct}) \right], 10 \right)$$

Where $\sum_{\substack{fnc-fct \in \\ \text{Functional} \\ \text{Factors}}} (W_{fnc-fct} \times f_{fnc-fct})$ is a total or sum of each of the functional factor weights ($W_{fnc-fct}$) multiplied by each functional value ($f_{fnc-fct}$) (e.g., based on each factor formula result), $\sum_{\substack{cnfg-fct \in \\ \text{Configurational} \\ \text{Factors}}} (W_{cnfg-fct} \times f_{cnfg-fct})$ is a total or sum of each of the configurational factor weights ($W_{cnfg-fct}$) multiplied by each configurational value ($f_{cnfg-fct}$) (e.g., based on each factor formula result), $\sum_{\substack{bvrl-fct \in \\ \text{Bahavorial} \\ \text{Factors}}} (W_{bvrl-fct} \times f_{bvrl-fct})$ is a total or sum of each of the behavioral factor weights ($W_{bvrl-fct}$) multiplied by each behavioral value ($f_{bvrl-fct}$) (e.g., based on each factor formula result).

In some embodiments, the weight for the functional factors may be one (100%) applied to asset criticality and asset acquittance values. The weight applied to potential configurational factors may be 0.6 (60%) for known vulnerabilities and EoL proximity. The weight applied to actual configurational factors may be 0.4 (40%) for open shares, default credentials, and open ports. The weight applied to potential behavioral factors may be 0.2 (20%) for Internet exposure, secure traffic posture, anomaly detection. The weight applied to actual behavioral may be 0.8 (80%) for SSL/TLS analysis, traffic reputation, and malicious activity detection.

In some embodiments, the risk value is determined using a sliding time window. The sliding time window may be a period of time that is used to determine which information, events, or other factors may be used for determining the risk value. For example, if the time window is 24 hours, then information, events, or other factors for the last 24 hours will be used to determine the risk value for the entity. The use of the sliding time window allows risk scores and values (e.g., associated with factors) to change (e.g., increase or decrease) based on changes to entities (e.g., patches of vulnerabilities, opening/closing of one or more ports, new vulnerabilities, new connections from the Internet, EoL proximity, etc.).

At block 418, the risk value for the entity is stored. The risk value for the entity may be stored for use in security procedures, asset inventory, segmentation, etc. In some embodiments, the risk value may be stored locally, remotely (e.g., in a cloud resource), or a combination thereof.

In some embodiments, an action may be performed based on the risk value. The action may be based on the risk value of the entity and be a security based action (e.g., based on a policy) or other business related action, as described herein. For example, an action may be performed based on a policy that an entity with a high enough risk score should be isolated or quarantined from the rest of the network.

At block 420, a change is detected with respect to the entity. The change may be detected based on a change in information associated with the entity. The change may be detected in a variety of ways. In some embodiments, the change may be detected based on checking a data store having information associated with the entity for new information (e.g., information different from previous information, new information within a given time period, for instance, since the most recent classification, information from another system, for instance, system 150, etc.). The additional information may include new data or information associated with an entity. The additional information may include a change in one or more property values (e.g., function, model), a new classification, a new vulnerability (e.g., CVE), a traffic flow associated with the entity (e.g., communication with a malicious IP address, Internet exposure, etc.), a risk setting change (e.g., by a user, for instance, a user change in criticality associated with the entity, a whitelisting of a vulnerability, whitelisting of an IP address, etc.), a change in the risk value formula (e.g., a fine tuning, updated formula, etc.), information from another system, information using active scanning or probing, a new open port, change in asset criticality, etc.

Block 420 may be performed as part of an automatic (e.g., without user involvement), periodic, continuous, or combination thereof computation or recalculation of one or more risk values associated with one or more entities. A recalculation of the risk value may be performed based on a change in a property value associated with an entity, a change in classification associated with the entity, etc.

The additional information may be accessed from another system (e.g., system 150), a cloud resource, another system performing classification (e.g., network monitor 102, network monitor 280, etc.), etc.

Figure 5:
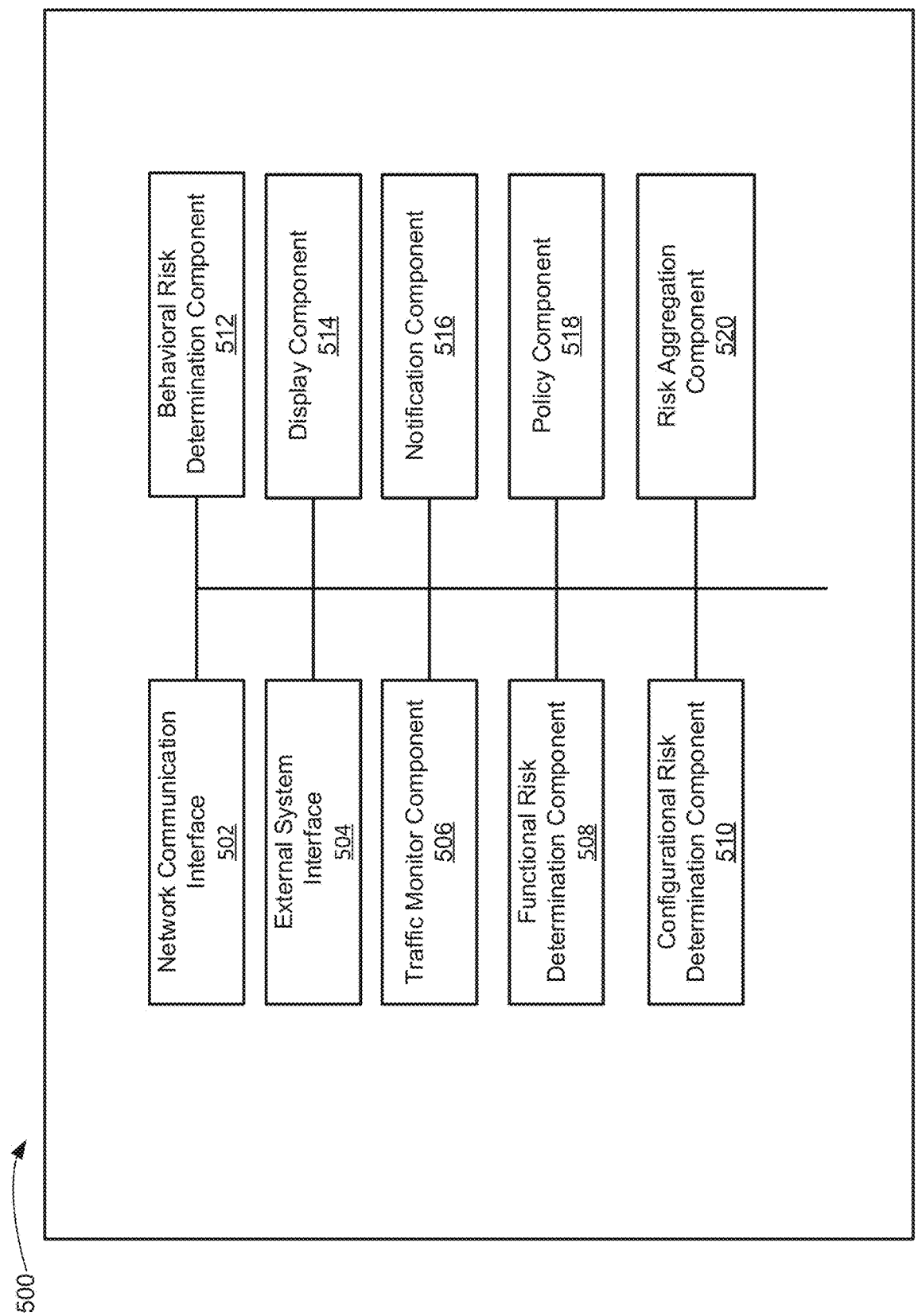
FIG. 5 depicts illustrative components of a system for determining a risk score in accordance with one implementation of the present disclosure.

FIG. 5 illustrates example components used by various embodiments. Although specific components are disclosed in system 500, it should be appreciated that such components are examples. That is, embodiments are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for determining a risk score in accordance with one implementation of the present disclosure. Example system 500 or access manager 500 includes a network communication interface 502, an external system interface 504, a traffic monitor component 506, a functional risk determination component 508, an configurational component 510, a behavioral risk determination component 512, a display component 514, a notification component 516, a policy component 518, and a risk aggregation component 520. The components of system 500 may be part of a computing system or other electronic device (e.g., network monitor device 102 or network monitor device 280) or a virtual machine or device and be operable to monitor and one or more entities communicatively coupled to a network, monitor network traffic, and perform determine comprehensive risk scores, as described herein. For example, the system 500 may further include a memory and a processing device, operatively coupled to the memory, which may perform the operations of or execute the components of system 500. The components of system 500 may access various data and characteristics associated with an entity (e.g., network communication information) and data associated with one or more entities. It is appreciated that the modular nature of system 500 may allow the components to be independent and allow flexibility to enable or disable individual components or to extend, upgrade, or combination thereof components without affecting other components thereby providing scalability and extensibility. System 500 may perform one or more blocks of flow diagram 300.

Communication interface 502 is operable to communicate with one or more entities (e.g., network device 104, firewalls 202-206, switches 210-220, other devices coupled thereto, devices 230-262, etc.) coupled to a network that are coupled to system 500 and receive or access information about entities (e.g., device information, device communications, device characteristics, etc.), access information as part of a passive scan, send requests of an active scan, receive active scan results or responses (e.g., responses to requests), as described herein. The communication interface 502 may be operable to work with one or more components to initiate access to characteristics or determination of characteristics of an entity to allow determination of one or more attributes which may then be used for device compliance, asset management, standards compliance, etc., as described herein. Communication interface 502 may be used to receive and store network traffic for determining device attributes, as described herein.

External system interface 504 is operable to communicate with one or more third party, remote, or external systems to access information including characteristics or attributes about an entity. External system interface 504 may further store the accessed information in a data store. For example, external system interface 504 may access information from a vulnerability assessment (VA) system to enable determination of one or more compliance or risk characteristics associated with the entity. External system interface 504 may be operable to communicate with a vulnerability assessment (VA) system, an advanced threat detection (ATD) system, a mobile device management (MDM) system, a firewall (FW) system, a switch system, an access point (AP) system, etc. External system interface 504 may query a third party system using an API or CLI. For example, external system interface 504 may query a firewall or a switch for information (e.g., network session information) about an entity or for a list of entities that are communicatively coupled to the firewall or switch and communications associated therewith. In some embodiments, external system interface 504 may query a switch, a firewall, or other system for information of communications associated with an entity.

Traffic monitor component 506 is operable to monitor network traffic to determine if a new entity has joined the network or an entity has rejoined the network and monitor traffic for analysis by functional risk determination component 508, configurational risk determination component 510, behavioral risk determination component 512, or a combination thereof, as described herein. Traffic monitor component 506 may have a packet engine operable to access packets of network traffic (e.g., passively) and analyze the network traffic. The traffic monitor component 506 may further be able to access and analyze traffic logs from one or more entities (e.g., network device 104, system 150, or aggregation device 106) or from an entity being monitored. The traffic monitor component 506 may further be able to access traffic analysis data associated with an entity being monitored, e.g., where the traffic analysis is performed by a third party system.

Functional risk determination component 508 is operable to determine a risk score based on one or more functional factors, as described herein. The determination of the functional risk may be based on asset criticality (e.g., asset criticality 312), asset acquaintance (e.g., asset acquaintance 314), as described herein. The functional risk may further be based on a respective weight associated with each of the factors, as described herein.

Configurational risk determination component 510 is operable to determine a risk score based on one or more configurational factors, as described herein. The determination of the configurational risk may be based on known vulnerabilities (e.g., known vulnerabilities 322), end of life (EoL) proximity (e.g., EoL proximity 324), open shares (e.g., open shares 332), default credentials (e.g., default credentials 334), open ports (e.g., open ports 336), etc., as described herein. The configurational risk may further be based on a respective weight associated with each of the factors, as described herein.

Behavioral risk determination component 512 is operable to determine a risk score based on one or more behavioral factors, as described herein. The behavioral risk may be determined based on one or more factors including Internet exposure (e.g., Internet exposure 342), secure traffic posture (e.g., secure traffic posture 344), anomaly detection (e.g., anomaly detection 346), SSL/TLS analysis (e.g., SSL/TLS analysis 352), traffic reputation (e.g., traffic reputation 354), and malicious activity detection (e.g., malicious activity detection 356), as described herein. The behavioral risk may further be based on a respective weight associated with each of the factors, as described herein.

Risk aggregation component 520 is operable to determine a risk value (e.g., for an entity) based on the functional risk and at least one of configurational risk or behavioral risk, as described herein. In some embodiments, risk aggregation component 520 may apply respective weights to one or more of the functional risk, configurational risk, and the behavior risk values, as described herein. The determination of the risk of an entity based on functional risk and at least one of configurational risk or behavioral risk provides a more comprehensive and improved risk assessment, as described herein Display component 514 is configured to optionally display one or more graphical user interfaces or other interfaces (e.g., command line interface) for depicting various information associated with entities or devices, alerts, asset management, and compliance with standards and other policies, as described herein. In some embodiments, display component 514 may display or render a network graph of entities, attributes associated with each entity or device, risk values, and indications of security policy alerts, compliance alerts, etc.

Notification component 516 is operable to initiate one or more notifications based on the results of monitoring communications or attributes of one or more entities (e.g., alerting of a new devices or high risk values, etc.), as described herein. The notification may be any of a variety of notifications, e.g., IT ticket, email, SMS, a HTTP notification, etc., as described herein.

Policy component 518 is operable for initiating or triggering one or more remediation actions or security actions according to one or more policies, e.g., based on one or more risk values, as described herein. Policy component 518 may further be configured to perform other operations including checking compliance status, finding open ports, etc. Policy component 518 may restrict network access, signal a patch system or service, signal an update system or service, etc., as described herein. The policy component 518 may thus, among other things, invoke automatically patching, automatically updating, and automatically restrict network access of an entity (e.g., that has out-of-date software or based on access rule violation or attempted violation).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 500 may be software stored on a non-transitory computer readable medium having instructions encoded thereon that, when executed by a processing device, cause the processing device to access network traffic from a network, where the network traffic is associated with a plurality of entities. The instructions may further cause the processing device to determine one or more values associated with one or more properties associated with an entity. The one or more values are based on the network traffic. The instructions may further cause the processing device to determine at least one of a functional risk value, a configurational risk value, or a behavioral risk value associated with the entity. At least one of the functional risk value, the configurational risk value, or the behavioral risk value associated with the entity is based at least one of the values associated with the one or more properties associate with the entity. The instructions may further cause the processing device to determine a risk value for the entity based on the functional risk value and at least one of the configurational risk value or the behavioral risk value associated with the entity and store the risk value for the entity.

In some embodiments, the instructions may further cause the processing device to perform an action based on the risk value. In various embodiments, the functional risk value is associated with at least one of asset criticality or asset acquittance associated with the entity. In some embodiments, the configurational risk value is associated with at least one of a vulnerability, an end of life proximity, an open port, a credential, or an open share. In various embodiments, the behavioral risk value is associated with at least one of Internet exposure, traffic posture, anomaly detection, encryption analysis, traffic reputation, or malicious activity. In some embodiments, the risk value associated with the entity is based on at least one of a weight associated with the functional risk value, a weight associated with the configurational risk value, or a weight associated with the behavioral risk value. In various embodiments, the risk value for the entity is determined based on at least one of an observed activity or a potential for compromise.

Figure 6:
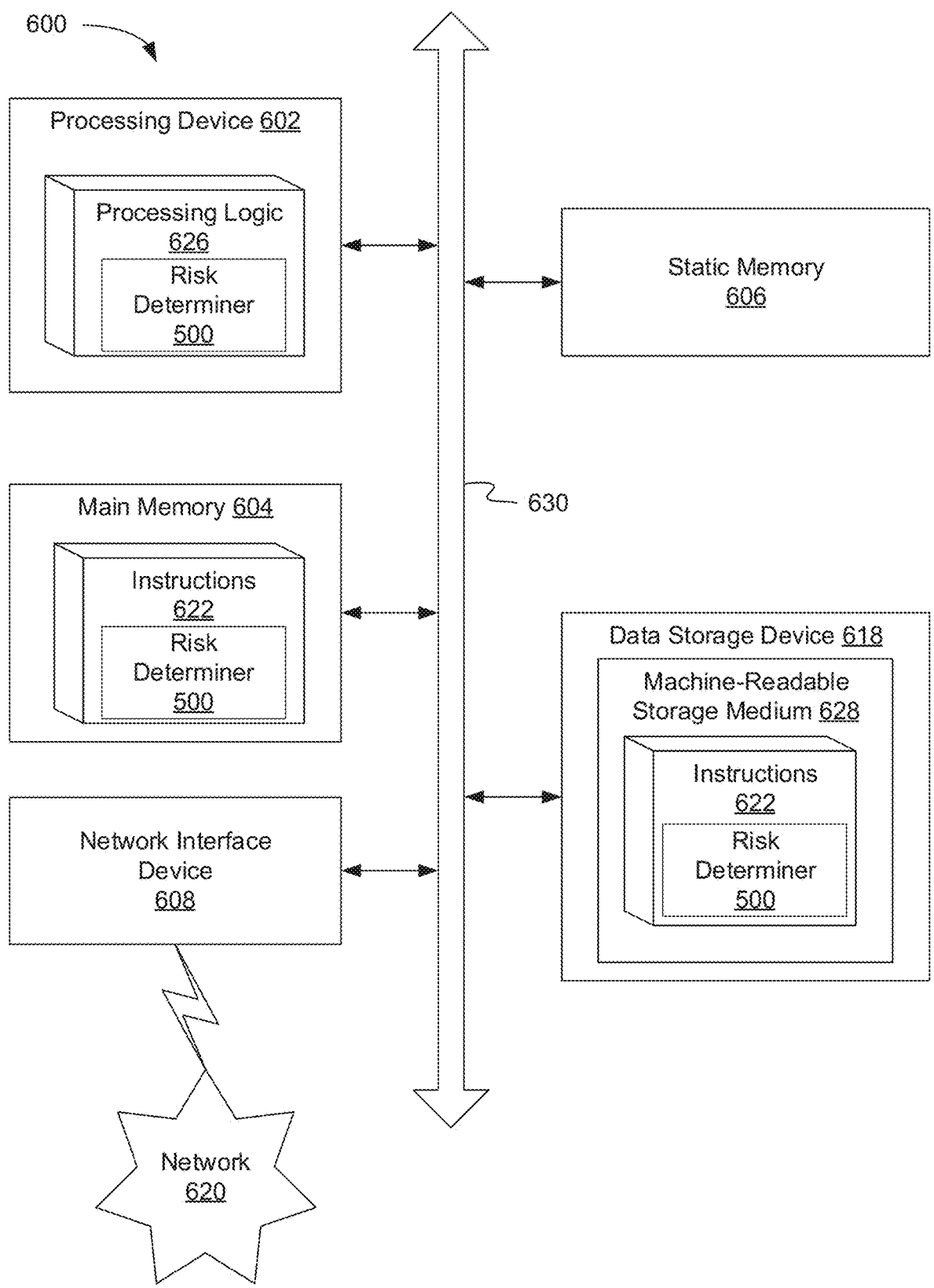
FIG. 6 is a block diagram illustrating an example computer system, in accordance with one implementation of the present disclosure.

FIG. 6 is a block diagram illustrating an example computer system, in accordance with one implementation of the present disclosure. FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as network monitor device 102 running risk determiner 500 to perform risk score or value determination, as described herein.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of risk determiner 500 shown in FIG. 5, for performing the operations and operations discussed herein.

The data storage device 618 may include a machine-readable storage medium 628, on which is stored one or more set of instructions 622 (e.g., software) embodying any one or more of the methodologies of operations described herein, including instructions to cause the processing device 602 to execute risk determiner 500. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for risk determination, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

accessing network traffic from a network, wherein the network traffic is associated with a plurality of entities coupled to the network;

determining one or more values associated with one or more properties associated with an entity of the plurality of entities coupled to the network, wherein the one or more values are based on the network traffic;

determining a classification defining a function of the entity within the network of the plurality of entities based at least in part on the one or more values associated with the one or more properties of the entity;

determining a risk state of the entity based on a state machine associated with the plurality of entities, wherein the risk state is selected from a plurality of states indicating whether the entity is safe, at risk, or risky;

determining a functional risk value associated with the entity based at least in part on the classification of the entity;

determining a configurational risk value associated with the entity based on at least one of an end of life proximity of the entity or open ports of the entity;

determining a behavioral risk value associated with the entity based at least in part on an encryption analysis, wherein the functional risk value comprises potential risk factors for the entity and wherein the configurational risk value and the behavioral risk value each comprise potential risk factors for the entity and actual current risk factors for the entity;

determining a risk value for the entity based on the functional risk value and at least one of the configurational risk value or the behavioral risk value associated with the entity, wherein the risk value indicates an overall level of risk for the network associated with the entity of the plurality of entities including risk to the network from attacks on the entity and risk to the network from attacks by the entity;

updating the risk state of the entity in the state machine based on at least one of the configurational risk value, the behavioral risk value, or the functional risk value for the entity;

storing the risk value for the entity; and
performing a remedial action based on the risk value.

2. The method of claim 1, wherein the functional risk value is associated with at least one of asset criticality or asset acquittance associated with the entity.

3. The method of claim 1, wherein the configurational risk value is further associated with at least one of a vulnerability, a credential, or an open share.

4. The method of claim 1, wherein the behavioral risk value is further associated with at least one of Internet exposure, traffic posture, anomaly detection, traffic reputation, or malicious activity.

5. The method of claim 1, wherein the risk value associated with the entity is based on at least one of a weight associated with the functional risk value, a weight associated with the configurational risk value, or a weight associated with the behavioral risk value.

6. The method of claim 1, wherein the risk value for the entity is determined based on at least one of an observed activity or a potential for compromise.

7. A system comprising:
a memory; and
a processing device, operatively coupled to the memory, to:
  access network traffic from a network, wherein the network traffic is associated with a plurality of entities coupled to the network;
  determine one or more values associated with one or more properties associated with an entity of the plurality of entities coupled to the network, wherein the one or more values are based on the network traffic;
  determine a classification defining a function of the entity within the network of the plurality of entities based at least in part on the one or more values associated with the one or more properties of the entity;
  determine a risk state of the entity based on a state machine associated with the plurality of entities, wherein the risk state is selected from a plurality of states indicating whether the entity is safe, at risk, or risky;
  determine a functional risk value associated with the entity based at least in part on the classification of the entity;
  determine a configurational risk value associated with the entity based on at least one of an end of life proximity of the entity or open ports of the entity;
  determine a behavioral risk value associated with the entity based at least in part on an encryption analysis, wherein the functional risk value comprises potential risk factors for the entity and wherein the configurational risk value and the behavioral risk value each comprise potential risk factors for the entity and actual current risk factors for the entity;
  determine, by the processing device, a risk value for the entity based on the functional risk value and at least one of the configurational risk value or the behavioral risk value associated with the entity, wherein the risk value indicates an overall level of risk for the network associated with the entity of the plurality of entities including risk to the network from attacks on the entity and risk to the network from attacks by the entity;
  update the risk state of the entity in the state machine based on at least one of the configurational risk value, the behavioral risk value, or the functional risk value for the entity;
  store the risk value for the entity; and
  perform a remedial action based on the risk value.

8. The system of claim 7, wherein the functional risk value is associated with at least one of asset criticality or asset acquittance associated with the entity.

9. The system of claim 7, wherein the configurational risk value is associated with at least one of a vulnerability, a credential, or an open share.

10. The system of claim 7, wherein the behavioral risk value is associated with at least one of Internet exposure, traffic posture, anomaly detection, traffic reputation, or malicious activity.

11. The system of claim 7, wherein the risk value associated with the entity is based on at least one of a weight associated with the functional risk value, a weight associated with the configurational risk value, or a weight associated with the behavioral risk value.

12. The system of claim 7, wherein the risk value for the entity is determined based on at least one of an observed activity or a potential for compromise.

13. A non-transitory computer readable medium having instructions encoded thereon that, when executed by a processing device, cause the processing device to:
  access network traffic from a network, wherein the network traffic is associated with a plurality of entities coupled to the network;
  determine one or more values associated with one or more properties associated with an entity of the plurality of entities coupled to the network, wherein the one or more values are based on the network traffic;
  determine a classification defining a function of the entity within the network of the plurality of entities based at least in part on the one or more values associated with the one or more properties of the entity;
  determine a risk state of the entity based on a state machine associated with the plurality of entities, wherein the risk state is selected from a plurality of states indicating whether the entity is safe, at risk, or risky;
  determine a functional risk value associated with the entity based at least in part on the classification of the entity;
  determine a configurational risk value associated with the entity based on at least one of an end of life proximity of the entity or open ports of the entity;
  determine a behavioral risk value associated with the entity based at least in part on an encryption analysis, wherein the functional risk value comprises potential risk factors for the entity and wherein the configurational risk value and the behavioral risk value each comprise potential risk factors for the entity and actual current risk factors for the entity;
  determine, by the processing device, a risk value for the entity based on the functional risk value and at least one of the configurational risk value or the behavioral risk value associated with the entity, wherein the risk value indicates an overall level of risk for the network associated with the entity of the plurality of entities including risk to the network from attacks on the entity and risk to the network from attacks by the entity;

update the risk state of the entity in the state machine based on at least one of the configurational risk value, the behavioral risk value, or the functional risk value for the entity;

store the risk value for the entity; and perform a remedial action based on the risk value.

14. The non-transitory computer readable medium of claim 13, wherein the functional risk value is associated with at least one of asset criticality or asset acquittance associated with the entity.

15. The non-transitory computer readable medium of claim 13,
wherein the configurational risk value is associated with at least one of a vulnerability, a credential, or an open share.

16. The non-transitory computer readable medium of claim 13, wherein the behavioral risk value is associated with at least one of Internet exposure, traffic posture, anomaly detection, traffic reputation, or malicious activity.

17. The non-transitory computer readable medium of claim 13, wherein the risk value associated with the entity is based on at least one of a weight associated with the functional risk value, a weight associated with the configurational risk value, or a weight associated with the behavioral risk value.

* * * * *